(12) United States Patent
Farrar et al.

(10) Patent No.: US 7,959,983 B1
(45) Date of Patent: Jun. 14, 2011

(54) THERMAL SPRAY FORMATION OF POLYMER COMPOSITIONS

(76) Inventors: Lawrence C. Farrar, Butte, MT (US); Aaron M. Cook, Missoula, MT (US); Scott L. Coguill, Butte, MT (US)

( * ) Notice: Subject to any disclaimer, the term of this patent is extended or adjusted under 35 U.S.C. 154(b) by 1071 days.

(21) Appl. No.: 10/970,047

(22) Filed: Oct. 20, 2004

Related U.S. Application Data

(60) Provisional application No. 60/513,304, filed on Oct. 21, 2003.

(51) Int. Cl.
*B05D 1/02* (2006.01)
(52) U.S. Cl. ........................................ 427/422; 427/244
(58) Field of Classification Search ................. 427/533, 427/422, 244
See application file for complete search history.

(56) References Cited

U.S. PATENT DOCUMENTS

| | | | |
|---|---|---|---|
| 2,434,911 A | 1/1948 | Denyssen | |
| 2,530,186 A | 11/1950 | Trimm et al. | |
| 3,677,471 A | 7/1972 | Deakin | |
| 3,873,024 A | 3/1975 | Probst et al. | |
| 3,958,758 A | 5/1976 | Piorkowski | |
| 4,065,057 A | 12/1977 | Durmann | |
| 4,289,807 A | 9/1981 | Christensen et al. | |
| 4,394,498 A * | 7/1983 | Kastelic | 528/193 |
| 4,582,756 A * | 4/1986 | Niinuma et al. | 428/327 |
| 4,624,865 A * | 11/1986 | Gindrup et al. | 427/126.2 |
| 4,688,722 A | 8/1987 | Dellassio et al. | |
| 4,711,833 A * | 12/1987 | McAneney et al. | 430/131 |
| 4,835,022 A | 5/1989 | Huhne | |
| 4,911,956 A | 3/1990 | Gabryszewski et al. | |
| 4,940,623 A | 7/1990 | Bosna et al. | |
| 5,021,259 A | 6/1991 | Singelyn | |
| 5,041,713 A | 8/1991 | Weidman | |
| 5,356,958 A | 10/1994 | Matthews | |
| 5,503,872 A | 4/1996 | MacKenzie et al. | |
| 5,718,863 A | 2/1998 | McHugh et al. | |
| 5,773,121 A * | 6/1998 | Meteer et al. | 428/117 |
| 6,074,194 A | 6/2000 | McHugh | |
| 6,342,272 B1 | 1/2002 | Halliwell | |
| 6,423,755 B1 * | 7/2002 | Allen et al. | 521/111 |
| 6,478,234 B1 | 11/2002 | Klein et al. | |
| 6,488,773 B1 | 12/2002 | Ehrhardt et al. | |

(Continued)

FOREIGN PATENT DOCUMENTS

DE 10048355 A1 * 4/2002

OTHER PUBLICATIONS

Farrar, et al., Declaration under Rule 132, 2004, pp. 1-3.
Farrar et al., NASA Phase II STTR Proposal: Radiative Thermal Spray System, May 14, 1998, pp. 3-9, 12-23, 32, 33, 40, 41, Montec Associates, Inc., Butte, MT.

(Continued)

*Primary Examiner* — Michael Barr
*Assistant Examiner* — Robert S Walters, Jr.
(74) *Attorney, Agent, or Firm* — Robert M. Hunter

(57) ABSTRACT

A system and method for applying a material, such as a polymer composition, to a substrate, the method comprising mixing the material with a heated carrier gas stream, spraying the material through a nozzle, and radiant and convective heating of the material during transport. Preferred embodiments of the system and method can be used to spray polyetherimides, polyimides, polyamides, thermoset resins (e.g., and epoxies, polyesters and silicones), liquid crystal polymers, compositions comprising a blowing agent, compositions comprising a binder, compositions comprising a metallized material, compositions that produce an open cell foam, and compositions that produce a closed cell foam.

27 Claims, 8 Drawing Sheets

U.S. PATENT DOCUMENTS

| | | |
|---|---|---|
| 6,793,976 B2 | 9/2004 | Klein et al. |
| 2001/0055652 A1 | 12/2001 | Dalzell, Jr. et al. |
| 2002/0110682 A1 | 8/2002 | Brogan |
| 2003/0207145 A1 | 11/2003 | Anderson et al. |
| 2003/0209610 A1 | 11/2003 | Miller et al. |

OTHER PUBLICATIONS

Farrar et al. NASA Phase II STTR Final Report: Radiative Thermal Spray System, Sep. 29, 2003, pp. 1-57, Montec Associates, Inc., Butte, MT.

* cited by examiner

THERMAL SPRAY FORMATION OF POLYMER COMPOSITIONS

CROSS-REFERENCE TO RELATED APPLICATIONS

This application claims the benefit of U.S. Provisional Application No. 60/513,304, filed Oct. 21, 2003, the disclosure of which application is incorporated by reference as if fully set forth herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of (Contract No. NAS1-00069) awarded by the National Aeronautics and Space Administration.

BACKGROUND OF THE INVENTION

This invention relates to a system and method for radiative spraying of polymeric compositions. In particular, the invention relates to a system and method for radiant thermal spray application of polymer foams and other coatings.

A variety of technologies are used to apply polymeric foams and coatings to substrates in the aerospace, aircraft, marine, automotive, appliance, transportation and construction industries. Applications for foams include thermal and acoustical insulation, insulation tiles and components, ablative components, abradable seals, cryogenic applications, water repellant barriers, radomes and firewalls.

In the field of foam application, one approach involves fabricating a preformed foam component by cutting the component from a large bung and attaching the component to the substrate. Another approach involves spraying the foam directly on to the substrate. Coatings are typically sprayed directly on to the substrate. Spraying methods include methods that involve melting the polymer (thermal spray methods) and methods that involve dissolving the polymer in a solvent (solvent spray methods).

Background art methods for applying spray-in-place foams utilize multiple component chemical and solvent based reactions to form the foam. These methods do not incorporate thermal spray technology (e.g., use of high temperatures to process constituent materials into a desired form while spraying onto a substrate).

Related art methods and systems for applying polymer foams and coatings have serious limitations. Manual methods which involve cutting foam components from large bungs are very expensive. Solvent spray methods release toxic (volatile organic compounds, VOC's) to the environment. Related art thermal spray methods which relay on hot combustion gas (3,000° C.) or hot plasma gas (10,000° C.) can result in overheating of spray particles in flight, which can cause degradation of the sprayed material, and in coatings that are rough, porous and poorly bonded.

These limitations are particularly acute when the polymer being sprayed is a thermoplastic polyamide, such as nylon, or a composition that comprises a polyamide. In fact, because of the potential for thermal degradation of the material, no operable polyamide spray foaming processes have been developed.

The foregoing review of the related art reveals that the problems associated with applying polymer foams and coatings to substrates have not been solved. There is still a need for a thermal spraying process that allows economical application of polymer foams and coatings to substrates that does not result in degradation of the foam or coating material and applied foams and coatings that are of poor quality.

Thermal spray technology is used extensively to apply ceramic and metal coatings. Some thermal spray techniques have been used to form polymer coatings. The applicants are aware of three patents that cover several of the traditional thermal spray techniques: U.S. Pat. No. 4,911,956 for spraying molten thermoplastic, U.S. Pat. No. 5,041,713 for plasma flame spray of polymers and U.S. Pat. No. 5,285,967 for high velocity oxygen fuel thermal spray of plastic coatings. These thermal spray methods and systems in the related art all use plasmas and combustion processes to melt the thermoplastic being sprayed.

Thermal spray techniques have not been used in the background art to apply foams. Current foams of this type require closed, heated and pressurized molds to convert the constituent materials into useful foams.

The background art is characterized by U.S. Pat. Nos. 2,434,911; 2,530,186; 3,677,471; 3,873,024; 3,958,758; 4,065,057; 4,289,807; 4,688,722; 4,835,022; 4,911,956 4,940,623; 5,021,259; and 5,041,713; 5,356,958; 5,503,872; 5,718,864; 6,074,194; 6,342,272; 6,478,234; 6,488,773; and 6,793,976; U.S. Statutory Invention Registration No. H2035; and U.S. Patent Application Nos. 2001/0055652; 2002/0110682; 2003/0207145; and 2003/0209610; the disclosures of which patents, invention statutory registrations and patent applications are incorporated by reference as if fully set forth herein.

In U.S. Pat. No. 2,434,911 Denyssen discloses a heating and spraying device. This device is limited in that it is configured to spray a low melting point metal alloy. The alloy enters the nozzle of the device under the force of gravity.

In U.S. Pat. No. 2,530,186 Trimm et al. disclose a portable apparatus for spraying molten metals. This invention is limited in that it is configured to spray a low melting point metal alloy. The alloy enters the nozzle of the device under the force of gravity.

In U.S. Pat. No. 3,677,471 Deakin discloses and apparatus and process for applying coatings. This invention is limited in that it relies on an unreliable heated transport tube arrangement. With this arrangement, many polymer powders of interest will melt in the tube during transport, preventing the delivery of more material. Moreover, the device does not allow the operator to control the temperature of the polymer during transport separate from the temperature of the polymer during spray.

In U.S. Pat. No. 3,873,024 Probst et al. discloses an apparatus for spraying different powders. This invention is limited in that structures are not provided to melt the powders in flight. Moreover, the jets introduced directed at the powder flow are oriented so as to create a helical powder flow.

In U.S. Pat. No. 3,958,758 Piorkowski discloses a spraying apparatus. This invention is limited in that a divergence nozzle is discloses which requires large amounts of added air to operate. Moreover, the device is configured to create suction at two stages: initially to draw in the polymer powder and later to draw in the heated air to process the powder. All this additional air intake requires greater heating capability.

In U.S. Pat. No. 4,065,057, Durmann discloses an apparatus for spraying heat responsive materials. This invention is limited in that it does not disclose radiant heating means and does disclose a mixing zone that is not large enough to allow complete interaction of the hot air with the sprayed polymer, which can lead to an incomplete melt. Moreover, the invention exposes an excessive amount of the transport tube and spray nozzle to the high temperatures created by electric heating elements. This can lead to the buildup of molten material inside the transport tube and greatly increases the possibility of material buildup on the nozzle.

In U.S. Pat. No. 4,289,807, Christensen et al. disclose an apparatus and method for fusion processing of thermoplastic resins. This invention is limited in that a single stream of superheated steam is used as the transport medium.

In U.S. Pat. No. 4,688,722, Dellassio et al. disclose a nozzle assembly for a plasma spray gun. This invention is limited in that its structures are appropriate for plasma flame spraying.

In U.S. Pat. No. 4,835,022, Huhne discloses a process and apparatus for coating components. This invention is limited in that its structures are appropriate for plasma flame spraying.

In U.S. Pat. No. 4,940,623, Bosna et al. disclose a thermal spray technique. This invention is limited in that it relies on the use of broken hollow glass microspheres. Moreover, the device is configured to spray molten copper particles.

In U.S. Pat. No. 5,021,259, Singelyn discloses a method for applying a continuous thermoplastic coating. This invention is limited in that it relies on the presence of an intermediate layer to improve the bonding of a thermoplastic to a metal substrate. The intermediate layer comprises a semi porous layer of a thermal sprayed material that is known to have good adhesion to the metal substrate. That semi-porous layer is then coated with the thermoplastic and subsequently reheated to achieve a pin-hole free coating.

In U.S. Pat. No. 5,356,958, Mathews discloses an impact resistant thermoplastic syntactic foam composite. This invention is limited in that it relies on using thermoset and thermoplastic binders with hollow glass or hollow carbon microspheres to create a syntactic foam core. The core material is produced using compression molding and a thermal spray technique is not disclosed.

In U.S. Pat. No. 5,503,872, MacKenzie et al. disclose a flameless plastic coating apparatus and method. This invention is limited in that it is configured such that heated air produced by combustion surrounds the tube through which powder is supplied to the apparatus and cooling air must be used to cool the tube.

In U.S. Pat. No. 5,718,863, McHugh et al. disclose a spray forming process. This invention is limited in that a liquid material is used as the input and a single stream of heated gas is used as the transport medium.

In U.S. Pat. No. 6,074,194, McHugh discloses a spray forming process. This invention is limited in that a liquid material is used as the input and a single stream of heated gas is used as the transport medium.

In U.S. Pat. No. 6,342,272, Halliwell discloses a multi-layer corrosion resistant coating. This invention is limited in that it requires the embedding of particles in a first coating before a second coating is applied.

In U.S. Pat. No. 6,478,234, Klein et al. disclose an adjustable injector assembly for melted powder coating deposition. This invention is limited in that requires that a rotatable powder injector be incorporated into a plasma gun.

In U.S. Pat. No. 6,488,773, Ehrhardt et al. disclose an apparatus and method for spraying a polymer. This invention is limited in that the polymer must be in a molten state before the spray operation begins.

In U.S. Pat. No. 6,793,976, Klein et al. disclose an apparatus and method for polymer spraying. This invention is limited in that no details for the construction of a spray gun are presented and the resulting protective layer is essentially free of voids.

In U.S. Statutory Invention Registration No. H2035, Halliwell discloses a method for applying a polymer coating to a substrate. This invention is limited in that a non-polar powder and a non-oxidizing shielding gas or a reducing gas must be used.

In U.S. Patent Application No. 2001/0055652, Dalzell, Jr. et al. disclose a method for making an abradable seal. This invention is limited in that no details of a plasma spray gun are disclosed.

In U.S. Patent Application No. 2002/0110682, Brogan discloses a non-skid coating. This invention is limited in that no details are provided on the thermal spray gun.

In U.S. Patent Application No. 2003/0207145, Anderson et al. disclose a method for adhering a sold polymer to a substrate. This invention is limited in that an intermediate adhesion promoting polymer coating of metal oxide is required.

In U.S. Patent Application No. 2003/0209610, Miller et al. disclose a high velocity oxygen fuel method for spray coating non-melting polymers. This invention is limited in that a torch and an oxygen fuel is required.

The above review of the background art reveals that problems remain in the art of thermal spray formation of foams and other coatings. There is still a need for a system and method for forming spray-in-place foams and coatings that are similar in performance to the molded foams and other coatings currently in use.

BRIEF SUMMARY OF THE INVENTION

One purpose of the invention is to form spray-in-place foams that are similar to the molded foams currently in use. The constituents of these foams require processing temperatures in excess of 250° Centigrade (C). Another purpose of the invention is to eliminate the need for the closed, heated and pressurized molds currently required to convert foam constituent materials into useful foams. Another purpose of the invention is to facilitate spraying of high Tg (90° C. to 420° C.) polymer materials to create a foam architecture or other coating.

One advantage of the invention is that economical application of polymer foams and coatings is possible. Another advantage of the invention is that volatile organic carbon (VOC) releases are not necessary. Yet another advantage of the invention is that thermal degradation of the material is reduced or eliminated. A further advantage of the invention is to facilitate thermal spraying of difficult-to-spray materials, such as polyamides.

The invention provides a method and system for applying polymer compositions to substrates and the foams and coatings so applied. Polymer compositions that can be applied with the invention include thermoplastic and thermoset polymers (only one of a very wide range of materials demonstrated with this technology, including polyamides, polyetherimides, polyimides, polyesters, epoxies, silicones, and liquid crystal polymers), foams, coatings, syntactic foams, materials with blowing agents, materials with binders, and electrostatic sprays. Metallized materials may be added to the polymer compositions for reduction of electromagnetic interference, stealth and fire protection. Both open cell foams and closed cell foams may be applied with the invention.

In another preferred embodiment, the invention is a method for directly applying a high temperature polymer as foam onto a substrate using a field deployable system. Preferably, the invention involves spraying polymer micro-balloons to form an adherent, mechanically-sound, low-density, high-quality insulating foam. The invention preferably involves using both radiation and convection to process the polymer materials while spray forming the foam.

In another preferred embodiment, the invention is a fully contained, field deployable apparatus that includes power distribution, heater controls, foam constituent material bins, flow controls, material transportation functions and a thermal spray apparatus. Operation of this embodiment requires only a power source, plant air and a source of dry, compressed inert gas, e.g., nitrogen gas or argon gas.

In another preferred embodiment, the thermal spray apparatus of the present invention comprises a ceramic cylinder that is closed on one end and open on the other. The open or exit end is preferably directed at the substrate to be coated with polymer foam. The closed or entrance end preferably contains the spray nozzle and electrostatic corona discharge tip. Preferably, connected to the spray nozzle is a conveyance tube containing the carrier gas that has entrained and transported the polymer powder material. The ceramic tube is preferably surrounded by two annular regions. The one in intimate contact with the ceramic core is the heater annulus. Outside this annular region is yet another that serves as the cooling annulus. Arranged in the heater annulus are a set of resistive element heaters constructed of coiled heater wire. The lengths of coiled heater wire are preferably wrapped around the ceramic core with four additional ceramic standoffs holding the wire coils in place in an evenly distributed manner. The elements are preferably wired in an electrically parallel fashion such that the loss of any single element does not preclude the operation of the other elements.

In a preferred embodiment, the radiant and convective heating is accomplished with a novel air flow arrangement. Ambient temperature gas enters the entrance end of the cooling annulus and cools the outer surface of the spray apparatus. Towards the exit end of the apparatus the cooling gas is directed into the inner heating annulus. The air travels back towards the entrance end of the apparatus while flowing over and through the resistive element heaters. At the entrance end of the apparatus the now hot gas is directed into the inner region of the cylindrical ceramic core. The hot gas enters the inner core of the spray apparatus via a series of jets arranged around the inner diameter of the inner cylindrical heating zone.

The jets of hot gas serve three purposes. The hot gas mixes with the stream of fluidized polymer that is entering the inner chamber through the spray nozzle and causes the polymer materials to heat to melt temperature. The hot gas jet also serves to keep the molten polymer particles from adhering to the inner wall of the cylindrical heating zone. Jets of gas with sufficient velocity tend to attach themselves to a surface adjacent to the jet exit. A portion of the jet remains attached to the inner wall of the heating zone as it travels the length of the cylinder and exits into free space. Finally, the hot jets tend to diffuse the flow of the carrier gas that fluidized and transported the polymer material into the heated zone. The result is a more uniform thickness deposition of the sprayed material. Without this diffusion, the thickness of the spray pattern tends to be greatest at the center of the spray pattern and rapidly tapering away towards the outer radius of the pattern.

This invention allows for the formation of spray-in-place foams consisting of polyimide micro-balloons, high glass transition temperature ($T_g$) polymer binders and other syntactic materials such as hollow glass or ceramic spheres. Previously, foams of this nature could only be fabricated using a closed, heated press mold. The resulting boards are then cut and shaped, then put into place using adhesives and other attachment methods. The sprayed polyimide foam could be applied directly to surfaces, reducing a pre-form step of manufacturing the boards and bungs, shaping them, then engineering and applying a system to keep them in place. Cost savings can be achieved in less material wastage and in labor need for the intermediate fabrication and installation steps required by current methods.

Related art methods and systems for applying thermoplastic foams and coatings have serious limitations. Manual methods which involve cutting foam components from large bungs are very expensive. Solvent spray methods release toxic (volatile organic compounds, VOC's) to the environment. Related art thermal spray methods which rely on hot combustion gas (3,000° C.) or hot plasma gas (10,000° C.) can result in overheating of spray particles in flight, which can cause degradation of the sprayed material, and in coatings that are rough, porous and poorly bonded. The methods that rely on combustion gases are inherently less clean due to the exhaust fumes and soot. Preferred embodiments of the invention are advantageous because of an attached jet flow feature that reduces the fouling of molten polymer on the inside of the convection heating zone. The attached jet flow also improves the heat transfer to the suspended polymer particles during flight. The attached jet flow improves the thickness uniformity of the foam layer produced. The spray nozzle in the current invention has less surface area exposed to the radiant heat of the heating zone. The spray nozzle in the current invention has a higher capacity for conductive cooling than background art nozzles. The overall size of the preferred embodiments of the present invention is smaller and the weight is lower than background art spray guns. This makes it more ergonomically useful.

A preferred feature of the spray nozzle of the preferred embodiment is the disclosed arrangement of a cooling heat sink to prevent excess temperature buildup at the nozzle exit. The face of the nozzle is in visual contact with the hot inner diameter of the ceramic inner cylinder. If, via radiant heating, the nozzle becomes hotter then the melt temperature of the polymer materials being sprayed an undesirable build up of material occurs around the nozzle exit orifice that eventually blocks the flow of material through the nozzle. In a preferred embodiment, the nozzle is surrounded by a conductive copper jacket that is in turned cooled either with water or air flow. The cooling takes place away from the hot zone and the cooling effect is conducted to the nozzle tip by a copper jacket or heat sink. This results in a reduction in the nozzle tip temperature relative to the heating zone and a reduction in the buildup of molten polymer on the nozzle exit.

In a preferred embodiment, the invention is a method comprising: mobilizing a polymer powder with an entrainment gas, heating this powder during transport to achieve a molten state, and spraying this molten material on a substrate to achieve a polymer coating.

In another preferred embodiment, the invention is a system for forming a foam on a substrate, said system comprising: a reservoir containing a polymer powder, said reservoir having a vibrator; one or more first sources of a carrier gas stream; a heater for heating said carrier gas stream to produce a heated carrier gas stream; an eductor for entraining said polymer powder in said heated carrier gas stream to produce a polymer particle stream; a hose for conveying said polymer particle stream, said hose having a hose heater; a second source of a convective heating gas stream; a third source of a cooling liquid stream; a spray gun for accepting said polymer particle stream from said hose, said spray gun comprising a corona discharge tip for charging said polymer particle stream, a voltage cascade for charging said corona discharge tip, a radiant tube having an interior wall for radiant heating of said charged polymer stream, a nozzle for emitting said charged polymer stream into said radiant tube, said nozzle having an interior surface, a heat sink for accepting said cooling liquid stream, removing heat from said nozzle and maintaining the temperature of said interior surface below the melting temperature of said polymer powder, said heat sink having a circumferential channel therein for circulating said cooling liquid through said heat sink, and a radiant shroud, said spray gun having a plenum for accepting said convective heating gas stream, a cooling annulus that is adjacent to said radiant shroud and in communication with said plenum and that has an aft end and a forward end, said cooling annulus being operative to direct said convective heating gas stream from said aft end to said forward end thereby cooling said radiant shroud, a heating annulus that is in communication with said forward end and that has a front end and a back end, said heating annulus containing a heater element for heating said interior wall and said convective heating gas stream, said heating annulus being operative to direct said convective heating gas from said front end to said back end, an aft end cap having a plurality of orifices therein that are in communication with said back end, said plurality of orifices being operative to direct a plurality of jets of heated convective heating gas along said inner wall thereby preventing said charged polymer stream from impacting on said inner wall and convectively heating said charged polymer stream; and a control panel. Preferably, the system of further comprises: one or more radiant panels attached to said spray gun for further heating said charged polymer stream and/or for heating the substrate. Preferably, the system further comprises: a grip having a trigger, said trigger being operative to activate the eduction of said polymer powder into said carrier gas stream. Preferably, said reservoir, said heater, said eductor and said control panel are mounted on a cart and said hose and said spray gun are mountable on said cart. Preferably, said control panel comprises a main power switch, a carrier gas selection switch for selecting among said one or more first sources, a carrier gas temperature controller for controlling said heater, a spray gun heater controller for controlling said heater element, a convective heating gas flow meter for controlling the flow rate of said convective heating gas, a voltage cascade switch for enabling said voltage cascade, a hose heater controller for controlling said hose heater, a vibrator control switch for enabling said vibrator, and a nozzle cooling medium flow meter for controlling the flow rate of said liquid cooling stream. Preferably, said nozzle is connected to said heat sink with a heat conducting paste and said corona is mounted in a corona mount that holds said heat sink against said nozzle, said corona mounted being locked on said nozzle by a locking O-ring.

In another preferred embodiment, the invention is a system for forming a foam on a substrate, said system comprising: a reservoir containing a polymer powder; one or more first sources of a carrier gas stream; an eductor for entraining said polymer powder in said carrier gas stream to produce a polymer particle stream; a hose for conveying said polymer particle stream; a second source of a convective heating gas stream; a third source of a cooling fluid stream; and a spray gun for accepting said polymer particle stream from said hose, said spray gun comprising a corona discharge tip for charging said polymer particle stream, a radiant tube having an interior wall for radiant heating of said charged polymer stream, a nozzle for emitting said charged polymer stream into said radiant tube, a heat sink for accepting said cooling fluid stream, removing heat from said nozzle, said heat sink having a circumferential channel therein for circulating said cooling fluid through said heat sink, and a radiant shroud, said spray gun having a plenum for accepting said convective heating gas stream, a cooling annulus that is in communication with said plenum and that has an aft end and a forward end, said cooling annulus being operative to direct said convective heating gas stream from said aft end to said forward end, a heating annulus that is in communication with said forward end and that has a front end and a back end, said heating annulus containing a heater element for heating said interior wall and said convective heating gas stream, said heating annulus being operative to direct said convective heating gas from said front end to said back end, an aft end cap having a plurality of orifices therein that are in communication with said back end, said plurality of orifices being operative to direct a plurality of jets of heated convective heating gas along said inner wall thereby preventing said charged polymer stream from contacting said inner wall and convectively heating said charged polymer stream. Preferably, the system further comprises: one or more radiant panels attached to said spray gun for further heating said charged polymer stream.

In another preferred embodiment, the invention is a method for forming a foam on a grounded substrate, said method comprising: heating a carrier gas stream to produce a heated carrier gas stream; entraining a polymer powder in said heated carrier gas stream to produce a polymer particle stream; conveying said polymer particle stream to a spray gun comprising a corona discharge tip, a voltage cascade, a nozzle having an interior surface, a heat sink located adjacent to said nozzle, a radiant shroud, and a radiant tube having an inner wall and an aft end cap having a plurality of orifices therein, said spray gun having a plenum, a cooling annulus that is adjacent to said radiant shroud and in communication with said plenum and that has an aft end and a forward end, and a heating annulus that is in communication with said forward end and that has a front end and a back end; accepting said polymer particle stream from said hose into said spray gun; charging on said polymer particle stream by passing it through a corona discharge space created by said corona discharge tip that is charged by said voltage cascade, thereby creating a charged polymer stream; removing heat from said nozzle and maintaining the temperature of said interior surface below the melting temperature of said polymer powder by circulating a cooling liquid circumferentially through said heat sink; spraying said charged polymer stream through said nozzle into said radiant tube and at the grounded substrate; radiant heating of said charged polymer stream in said radiant tube; accepting a convective heating gas stream into said plenum, directing said convective heating gas from said plenum into said aft end of said cooling annulus, said cooling annulus being operative to direct said convective heating gas stream from said aft end to said forward end thereby cooling said radiant shroud and then into said front end of said heating annulus, said heating annulus containing heater elements for heating said interior wall and said convective heating gas stream, said heating annulus being operative to direct said convective heating gas from said front end to said back end, said plurality of orifices being in communication with said back end and being operative to direct a plurality of jets of heated convective heating gas along said inner wall thereby preventing said charged polymer stream from impacting on said inner wall and convectively heating said charged polymer stream; and collecting at least a portion of said charged polymer stream on the grounded substrate. Preferably, said heating a carrier gas stream step is selected from the group consisting of: heating a stream of air; and heating a stream of nitrogen gas. Preferably, said entraining a polymer powder step comprises entraining a polyamide. Preferably, said entraining a polymer powder step is selected from the group consisting of: entraining a polyetherimide; entraining a polyimide; entraining a thermoplastic composition comprising a blowing agent; entraining a thermoplastic composition comprising a binder; entraining a thermoplastic composition comprising a metallized material; entraining a composition comprising a component of an open cell foam; and entraining a composition comprising a component of a closed cell foam. Preferably, the method further comprises: prior to said entraining step, seeding said polymer powder with a conductive material that comprise silver-coated hollow glass spheres with a nominal diameter of about 62 micrometers and a bulk density of about 0.5 grams per cubic centimeter.

In another preferred embodiment, the invention is a method for forming a coating on a substrate, said method comprising: entraining a polymer powder in a carrier gas stream to produce a polymer particle stream; conveying said polymer particle stream to a spray gun comprising a corona discharge tip, a nozzle having an interior surface, a heat sink located adjacent to said nozzle, a radiant shroud, and a radiant tube having an inner wall and an aft end cap having a plurality of orifices therein, said spray gun having a plenum, a cooling annulus that is adjacent to said radiant shroud and in communication with said plenum and that has an aft end and a forward end, and a heating annulus that is in communication with said forward end and that has a front end and a back end; accepting said polymer particle stream into said spray gun; charging on said polymer particle stream by passing it through a corona discharge space created by said corona discharge tip, thereby creating a charged polymer stream; removing heat from said nozzle and maintaining the temperature of said interior surface below the molten temperature of said polymer powder by circulating a cooling liquid circumferentially through said heat sink; spraying said charged polymer stream through said nozzle into said radiant tube and at the substrate; radiant heating of said charged polymer stream in said radiant tube; accepting a convective heating gas stream into said plenum, directing said convective heating gas from said plenum into said aft end of said cooling annulus, said cooling annulus being operative to direct said convective heating gas stream from said aft end to said forward end thereby cooling said radiant shroud and then into said front end of said heating annulus, said heating annulus containing heater elements for heating said interior wall and said convective heating gas stream, said heating annulus being operative to direct said convective heating gas from said front end to said back end, said plurality of orifices being in communication with said back end and being operative to direct a plurality of jets of heated convective heating gas along said inner wall thereby preventing said charged polymer stream from impacting on said inner wall and convectively heating said charged polymer stream; and collecting at least a portion of said charged polymer stream on the substrate. Preferably, the method further comprises heating said carrier gas stream to a temperature that is lower than the melting temperature of the polymer powder. Preferably, said heating said carrier gas stream step is selected from the group consisting of: heating a stream of air; and heating a stream of nitrogen gas.

In another preferred embodiment, the invention is an apparatus for forming a coating on a substrate, said apparatus comprising: means for entraining a polymer powder in a carrier gas stream to produce a polymer particle stream; means for spraying, said means for spraying comprising a corona discharge tip, a nozzle having an interior surface, a heat sink located adjacent to said nozzle, a radiant shroud, and a radiant tube having an inner wall and an aft end cap having a plurality of orifices therein, said means for spraying having a plenum, a cooling annulus that is adjacent to said radiant shroud and in communication with said plenum and that has an aft end and a forward end, and a heating annulus that is in communication with said forward end and that has a front end and a back end; means for conveying said polymer particle stream to said means for spraying; means for accepting said polymer particle stream from said means for conveying into said means for spraying; means for charging on said polymer particle stream by passing it through a corona discharge space created by said corona discharge tip, thereby creating a charged polymer stream; means for removing heat from said nozzle and maintaining the temperature of said interior surface below the molten temperature of said polymer powder by circulating a cooling liquid circumferentially through said heat sink; means for discharging said charged polymer stream through said nozzle into said radiant tube and at the substrate; means for radiant heating of said charged polymer stream in said radiant tube; and means for accepting a convective heating gas stream into said plenum and means for directing said convective heating gas from said plenum into said aft end of said cooling annulus, said cooling annulus being operative to direct said convective heating gas stream from said aft end to said forward end thereby cooling said radiant shroud and then into said front end of said heating annulus, said heating annulus containing heater elements for heating said interior wall and said convective heating gas stream, said heating annulus being operative to direct said convective heating gas from said front end to said back end, said plurality of orifices being in communication with said back end and being operative to direct a plurality of jets of heated convective heating gas along said inner wall thereby preventing said charged polymer stream from impacting on said inner wall and convectively heating said charged polymer stream.

In another preferred embodiment, the invention is a method for forming a coating on a substrate, said method comprising: a step for entraining a plurality of polymer particles in a carrier gas stream to produce a polymer particle stream; a step for conveying said polymer particle stream to a spray gun comprising a corona discharge tip, a nozzle having an interior surface and a radiant tube having an inner wall, said spray gun having a plenum and a heating annulus that is in communication with said plenum; a step for accepting said polymer particle stream into said spray gun; a step for charging on said polymer particle stream by passing it through a corona discharge space created by said corona discharge tip, thereby creating a charged polymer stream; a step for removing heat from said nozzle and maintaining the temperature of said interior surface below the molten temperature of said polymer particles; a step for spraying said charged polymer stream through said nozzle into said radiant tube and at the substrate; a step for radiant heating of said charged polymer stream in said radiant tube; a step for accepting a convective heating gas stream into said plenum and directing said convective heating gas from said plenum into said heating annulus and through a plurality of pinholes in said radiant tube; and a step for collecting at least a portion of said charged polymer stream on the substrate.

In another preferred embodiment, the invention is a method for applying a material to a substrate, the method comprising: mixing the material with a heated carrier gas stream; placing an electrostatic charge on the material; spraying the charged material through a nozzle and into a radiant/convective heating zone within a radiant tube having an interior surface; controlling the temperature of the nozzle below the melting temperature of the material; discharging a convective heating gas into said radiant tube as jets in a manner that results in a first portion of said jets being attached to said interior surface and a second portion of said jets mixes with said charged material within said radiant tube; and radiant and convection heating of the charged material within said radiant/convective heating zone. Preferably, the material is a thermoplastic composition. Preferably, the method further comprises: before the spraying step is accomplished, preheating the substrate.

In another preferred embodiment, the invention is a system for applying a material to a substrate, the system comprising: means for mixing the material with a heated carrier gas stream; means for placing an electrostatic charge on the material; means for spraying the charged material through a nozzle and into a radiant/convective heating zone within a radiant tube having an interior surface; means for controlling the temperature of the nozzle below the melting temperature of the material; means for discharging a convective heating gas into said radiant tube as jets in a manner that results in a first portion of said jets being attached to said interior surface and a second portion of said jets mixes with said charged material within said radiant tube; radiant and convection heating of the charged material within said radiant/convective heating zone. In another preferred embodiment, the invention is a foam or coating formed or applied in accordance with a method disclosed herein.

In an alternative embodiment, the method and system involve mixing a material to be sprayed with a heated carrier gas stream, spraying the material through a nozzle to transport it to a substrate and radiant heating of the material during transport. In a preferred embodiment, the material is withdrawn from a tank assembly. Material mobility is preferably enhanced by vibrating the tank assembly with an electrically-driven vibrator that is attached to the tank assembly.

In an alternative embodiment, material in withdrawn from the tank is mixed with a heated gas (e.g., air) stream by means of an eductor assembly. In this embodiment, the eductor is a modified Laval nozzle assembly, with the dry materials being introduced at the throat. The carrier gas flow rate is adjusted to control the amount of suction created at the nozzle which pulls the material into the flow stream.

In an alternative embodiment, the mixture of material and air is directed into a means for adding an annulus of flowing, heated air to the flow stream. In a preferred embodiment, a mixing T is used which is comprised of an inner tube that contains flowing, fluidized material and an outer tube that adds an annulus of heated air to the flow stream. This secondary air stream both preheats the material and assists in providing a smooth, even transport of the material to the spray nozzle. The secondary air stream is preferably heated by means of an electric, in-line resistive heater element, although any conventional gas-heating means will suffice. The purpose of the pre-heat step is to heat the material to as high a temperature as possible, without making the material tacky, which causes the material to stick to the tubing walls. This step also reduces the amount and intensity of radiant heat required to melt the material and vaporize any blowing agent(s) during the flight of the material from the nozzle to the substrate.

In another alternative embodiment, additional heated air (heated fan air) is added to the flow stream at the exit nozzle using a manifold with multiple ports that direct and evenly distribute the additional heated air into the flow stream. The additional heated air is preferably heated to a relatively high temperature range, preferably above the melting temperature of the material, and typically about 500° C. The additional air heats the material primarily by also acts to heat the substrate that is the target of the spray.

After the flow stream leaves the exit nozzle, a radiative heater section preferably adds additional heat to the material during its flight to the substrate and on the substrate to polymerize and otherwise cure the material as it is deposited. In a preferred embodiment, the radiative heater section includes a proximity sensor and one or more temperature sensors.

An alternative embodiment of the invention includes an application control device that has a two-position trigger. In use, one trigger position allows the system to be used to preheat the substrate and a second trigger position causes material to be sprayed on to the substrate.

In alternative embodiments, the system comprises a process control unit and a thermal spray gun. Multiple supply hoppers or tanks may be provided in the process control unit that are connected by a manifold to the thermal spray gun, allowing multiple materials to be graded by laying down a pass of a base material, followed by one or more coats of other material. In an alternative embodiment, simultaneous feeding of different materials from two or more hoppers is possible. The relative rate of feed of each material can be varied to allow gradation of the sprayed material properties.

An alternative embodiment of the invention is a method for applying a material (e.g., a polymer composition) to a substrate, the method comprising the steps of: fluidizing a material to be applied; metering the material into and mixing it with a heated carrier-gas stream; spraying the material through a nozzle to transport it to a substrate; and radiant heating of the material during transport.

In use, an alternative embodiment of the invention is operated by adding a material to be sprayed to a storage hopper and pressurizing the hopper with a fluidizing gas in such a way that the material is fluidized. The invention is preferably first used to preheat the substrate to which the material is to be applied. After the substrate is preheated, the fluidized material withdrawn from the hopper at a controlled rate and is mixed with a gas stream to produce a flow stream comprised of the material and the gas. A pre-heated carrier gas stream is added to the flow stream, preferably in an annulus around the flow stream which carries the flow stream to an exit nozzle which is directed at the substrate. Preferably, an additional flow of heated gas is added to the flow stream at the exit nozzle and a radiative heating element is used to further heat the material during its flight to the substrate and preferably, to polymerize or otherwise cure the material as it is deposited.

Another alternative embodiment of the invention involves using electrical resistant element heaters to provide radiant and convective heating of a gas stream containing suspended polymer powder particles (foam constituent materials). The polymer material is preferably melted in flight (on its way to the substrate) where it accumulates in the form of a coating: an open cell foam or a closed cell syntactic foam, depending on the materials sprayed.

In another preferred embodiment, the invention is a method for applying a plurality of materials on a substrate, the method comprising: mixing a first material with a heated carrier gas stream; placing an electrostatic charge on said first material; spraying the charged first material through a nozzle and into a radiant/convective heating zone within a radiant tube having an interior surface; mixing a second material with said heated carrier gas stream; placing an electrostatic charge on said second material; spraying the charged second material through a nozzle and into a radiant/convective heating zone within said radiant tube having an interior surface; controlling the temperature of the nozzle below the melting temperatures of said first material and said second material; discharging a convective heating gas into said radiant tube as jets in a manner that results in a first portion of said jets being attached to said interior surface and a second portion of said jets mixing with said charged first material or said charged second material within said radiant tube; and radiant and convection heating of said charged first material and said charged second material within said radiant/convective heating zone. Preferably, at least one of said materials comprises a polymer and an additive. Preferably, said mixing a first material with a heated carrier gas stream step comprises mixing a first material with a heated inert carrier gas stream.

In another preferred embodiment, the invention is a method for applying material on a substrate, the method comprising: mixing a material comprising a plurality of polyimide microballoons and a polyimide powder binder with a nitrogen carrier gas stream that has a flowrate of about 30 liters per minute and that is heated to a temperature of about 200° C. by a 1,000-watt high velocity inline heater; conveying said material to a nozzle assembly in a heated/insulated umbilical hose that is heated to a temperature of about 200° C.; placing an electrostatic charge on said material with a positive 70 kilovolt voltage cascade; spraying the charged first material through a nozzle having a port size of about 7 millimeters and into a radiant/convective heating zone within a radiant tube having an interior surface, said radian/convective heating zone having a length to diameter ratio that preferably ranges from 1:2 to 3:1 and producing about 2,500 watts of radiant/convective heat and having a temperature of about 650° C.; controlling the temperature of the nozzle below the melting temperatures of said material; discharging a convective heating gas stream having a flowrate of about 100 liters per minute into said radiant tube as jets in a manner that results in a first portion of said jets being attached to said interior surface and a second portion of said jets mixing with said charged material within said radiant tube to form a spray; and directing said spray at a substrate having a temperature in the range of about 250° C. to about 300° C.

In another preferred embodiment, the invention is a system for forming a coating on a substrate, said system comprising: a plurality of reservoirs, with each reservoir containing a different polymer composition; one or more first sources of a carrier gas stream; a plurality of eductors, with each eductor being capable of entraining one of said different polymer compositions in said carrier gas stream to produce a different polymer particle stream; a manifold for selecting one of said different polymer particle streams or at least two of said different polymer particle streams to produce a different particle stream; a hose for conveying said different particle stream; a second source of a convective heating gas stream; a third source of a cooling fluid stream; and a spray gun for accepting said different particle stream from said hose, said spray gun comprising a corona discharge tip for charging said different particle stream, a radiant tube having an interior wall for radiant heating of said charged different particle stream, a nozzle for emitting said charged different particle stream into said radiant tube, a heat sink for accepting said cooling fluid stream, removing heat from said nozzle, and a radiant shroud, said spray gun having a plenum for accepting said convective heating gas stream, a cooling annulus that is in communication with said plenum and that has an aft end and a forward end, said cooling annulus being operative to direct said convective heating gas stream from said aft end to said forward end, a heating annulus that is in communication with said forward end and that has a front end and a back end, said heating annulus containing a heater element for heating said interior wall and said convective heating gas stream, said heating annulus being operative to direct said convective heating gas from said front end to said back end, an aft end cap having a plurality of orifices therein that are in communication with said back end, said plurality of orifices being operative to direct a plurality of jets of heated convective heating gas along said inner wall thereby preventing said charged polymer stream from contacting said inner wall and convectively heating said charged different particle stream.

In another preferred embodiment, the invention is a method for forming a coating on a substrate, said method comprising: conveying a mixture comprising an unmelted polymer and a carrier gas to a spray nozzle; placing an electrostatic charge on said mixture to produce a charged mixture; spraying a charged mixture through said spray nozzle into a radiant/convective heating zone in which said charge mixture is heated and combined with a convective heating gas to produce a molten charged mixture; and directing said molten charged mixture at a grounded substrate.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
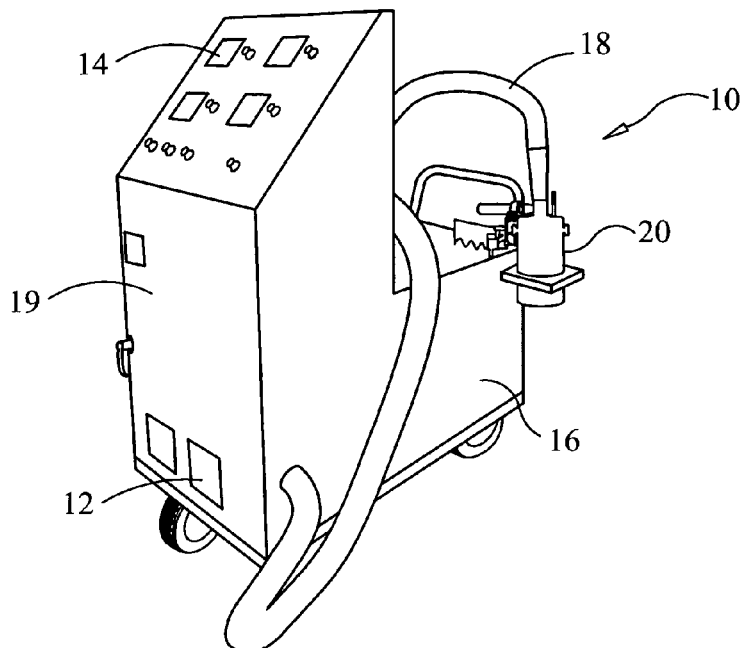
FIG. 1 is a perspective view of a preferred embodiment of the invention.

The following reference numerals are used to indicate the parts and environment of the invention on the drawings:
   10 system, apparatus, device
   12 power distribution segment
   14 control panel segment, control panel
   16 powder bin segment, powder bin
   18 umbilical hose segment, umbilical hose
   19 cart 20 spray gun segment, spray gun
32 first module
34 second module
36 third module
40 carrier gas
42 carrier gas flow meter
44 carrier gas inline heater
45 carrier gas temperature controller
46 carrier gas thermocouple, carrier gas feedback thermocouple
48 powder, material, powdered polymer foam constituents, polymer
50 material reservoir, supply hopper, supply tank, hopper
52 eductor, eductor T
54 heated/insulated umbilical hose, umbilical hose
56 mixture, carrier gas with entrained polymer powder, powder flow
60 mixture thermocouple
62 voltage cascade
64 DC control, voltage cascade switch
66 nozzle, spray gun nozzle, spray nozzle
68 nozzle assembly
70 radiant/convective heating zone, inner cavity, inner chamber, heating zone
72 heating zone heater, coiled heater elements
74 convective heating gas, convective heating air
76 convective heating gas flow meter
78 convective/radiant heating annulus, heating annulus
80 radiant panels
82 substrate
84 radiant heat
86 nozzle face
88 nozzle throat
120 cart assembly
122 power cord receptacle
124 powder bin
126 hopper vibrator, supply hopper vibrator
128 carrier gas inlets, carrier gas inlet connectors, quick connects
130 carrier gas selection solenoid
132 bypass solenoid
134 spray gun holder
140 main power switch
142 carrier gas selection switch
144 spray gun heater controller
146 umbilical hose heater controller
148 vibrator control switch
150 nozzle cooling medium flow meter
152 first auxiliary temperature controller
154 second auxiliary temperature controller
156 auxiliary activation switch
170 grip
172 trigger
174 radiant shroud
176 inlet and outlet connectors, nozzle cooling medium inlet and outlet ports
200 gun barrel
201 carrier gas inlet
202 corona charging tip, charging tip, corona tip
203 high-voltage electrode corona discharge space
204 heat sink
205 corona mount
206 locking O-ring
208 nozzle support
209 inlet/outlet holes
210 plenum
212 convective heating gas inlet
214 aft end
216 forward end
218 cooling annulus
224 front end
226 back end
230 radiant core, radiant tube
232 heater element supports
240 slots
242 forward end cap
244 aft end cap
250 orifices, jet orifices, small orifice openings, radial slots
252 circumferential slot
254 air tight electrical connector
256 cooling channel

DETAILED DESCRIPTION OF THE INVENTION

Referring to FIG. 1, a preferred embodiment of system 10 is illustrated. In this embodiment, system 10 is a self-contained, field-deployable thermal spray system. System 10 comprises five distinct yet integrated operating segments: on-board power distribution segment 12, control panel segment 14, powder bin segment 16, umbilical hose segment 18 and spray gun segment 20. In a preferred embodiment, segments 12, 14 and 16 are incorporated into cart 19.

When supplied with 480-volt single-phase power, power distribution segment 12 utilizes transformers to provide 240-volt, 120-volt AC power as well as 24-volt DC power to the rest of system 10. Control panel segment 14 provides the operator of system 10 control of the power to the various heaters, temperature control of the various heaters, flow control of the carrier gas, selection of the type of carrier gas used, as well as on/off control of the vibrator attached to the powder bin segment 16. Insulated, heated umbilical hose segment 18 conveys preheated mixture 56 of powder 48 and carrier gas 40 to spray gun segment 20. A preferred embodiment of system 10 has the following features: 2,500 watts of radiant/convective heat; special radiant/convection heating to provide radiation and forced convection heat transfer with a slip stream of hot gas that keeps the interior of the heating zone clean of debris; a radiant/convective heating zone temperatures of 650° C.; NiCr or FeCrAl heating elements; a portable system (less than 2.7 kg) with a two or three meter umbilical hose; a heat shielded grip with a high cycle switch; a positive 70 kV of electrostatic charge for increased transfer efficiency; a self-contained heat shielded corona electrode; a cooled nozzle tip to prevent tip fouling; a Delrin® gun body construction for electrical insulation and thermal resistance; an aluminum radiant shroud and plenum for durability and light weight; and an enclosed barrel housing for cool operation and complete housing of wires and tubing.

Figure 2:
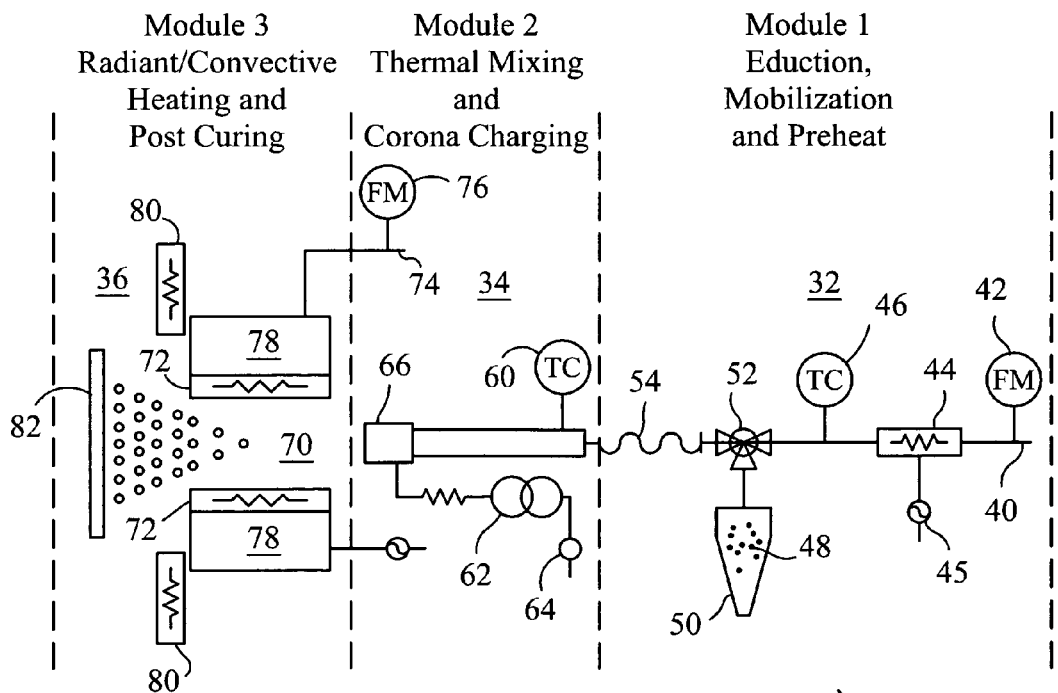
FIG. 2 is a process flow diagram illustrating the operating principles of a preferred embodiment of the invention.

Referring to FIG. 2, a schematic process flow diagram illustrates the operating principles of a preferred embodiment of the present invention. From an operating perspective, this embodiment comprises three operational modules.

First module 32 provides powdered polymer eduction, mobilization and preheating. The flow rate of carrier gas 40 is measured by carrier gas flow meter 42 and the temperature of carrier gas 40 is raised by carrier gas inline heater 44 that is controlled by carrier gas temperature controller 45 and measured by carrier gas thermocouple 46 (which is preferably a Type K thermocouple). In a preferred embodiment, a 1,000-watt high velocity inline gas (e.g., air) heater from Farnam Custom Products is used. Powder 48 is fluidized in material reservoir 50 and drawn into eductor 52 where it is mixed with carrier gas 40. Mixture 56 of carrier gas 40 and powder 48 is further heated in heated/insulated umbilical hose 54. Carrier gas 40 is preferably air or nitrogen or any other non-flammable gas. High-temperature silicone insulation is used to limit heat losses from the conveyed particles and the conveying gas. A 12 mm thick silicone insulation is used to compensate for heating losses during powder transport.

In second module 34, the particles of powder 48 in mixture 56 undergo thermal mixing and corona charging to induce a strong electrostatic charge on powder 48. The temperature of mixture 56 is measured by mixture thermocouple 60. A charge is placed on powder 48 by a corona tip (not shown) that is in turn charged by voltage cascade 62 which is controlled by DC control 64. In a preferred embodiment, corona charging of powder 48 occurs prior to discharge of the mixture through nozzle 66. In an alternative embodiment, corona charging occurs as or after mixture 56 leaves nozzle 66. To avoid saltation in the radiant heat zone, a 7 mm port size is used on nozzle 66. Adding a chamfer to this port reduces turbulence and provides a more controlled powder stream.

In third module 36, powder 41 is brought to molten temperatures by radiant and convective heating in radiant/convective heating zone 70. Radiant/convective heating zone 70 is heated by heating zone heater 72. A preferred configuration for radiant/convective heating zone 70 is a cylindrical shape with a length to diameter ratio that is preferably about 1.5:1 but that may be in the range from about 1:2 to about 3:1. In a preferred embodiment, convective heating gas 74 is metered into radiant/convective heating zone 70 by convective heating gas flow meter 76 and heated in convective/radiant annulus 78. Hot convective heating gas 74 is exhausted from the nozzle end of radiant/convective heating zone 70 which also heats powder 48. The maximum obtainable watt density was about 9 watts/square centimeter. A Kanthal FeCrAl—Al heating element is preferred, which typically produces a higher element temperature than less preferred embodiments that use nickel-chromium alloy. Zircar Z-500 is preferred for the radiant end caps due to its low density, ease of machining, and high thermal resistance. Fiberfrax insulation is preferred in the region between the heating elements and the radiant shroud. The radiant shroud is preferably made from aluminum due to its light weight. In an alternative embodiment, radiant panels 80 and convective/radiant annulus 78 can also be used to heat substrate 82. In a preferred embodiment, each of the radiant panels 80 supplies about 2,500 watts of radiant heat at a temperature of about 1100° C. A preferred substrate temperature for polyimide spraying is between 250 and 300° C.

Figure 3:
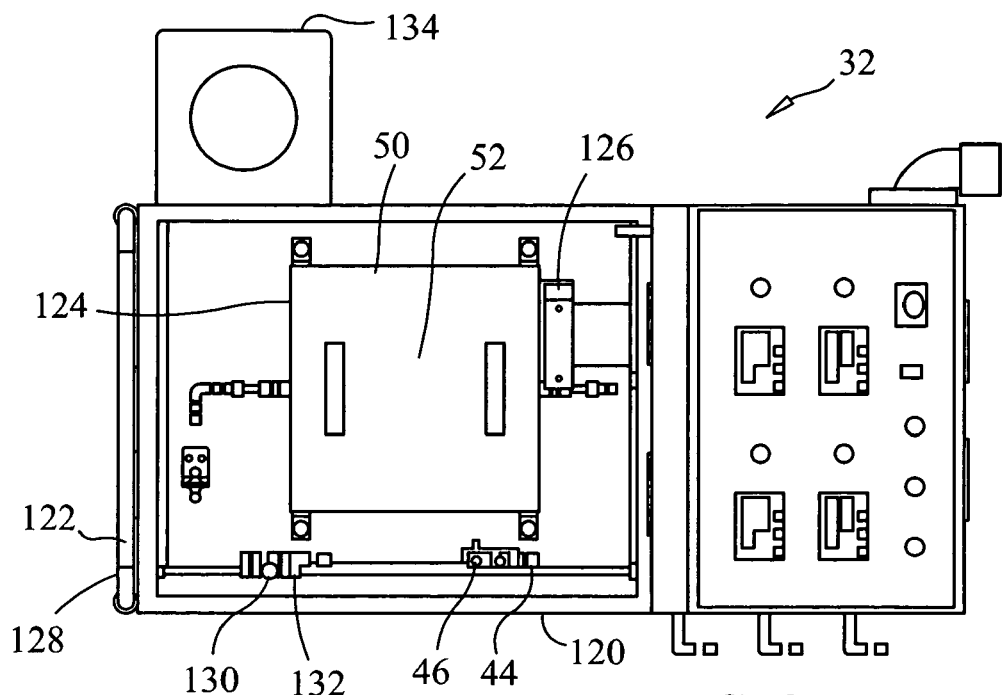
FIG. 3 is a plan view of the powder particle mobilization, heating, and transportation portion of a preferred embodiment the invention.

Referring to FIG. 3, the components of first module 32 of a preferred embodiment of system 10 are presented. Cart assembly 120 has input power cord receptacle 122 located at the rear of the cart. Located inside cart assembly 120, powder bin 124 comprises of supply hopper 50 with attached hopper vibrator 126. FIG. 3 also depicts the location of multiple carrier gas inlets 128. In a preferred embodiment, compressed, dry, oil-free plant air is used as carrier gas 40 and in an alternative embodiment compressed dry nitrogen is used as an additional carrier gas 40. Other carrier gases may also be used. The two carrier gasses meet at carrier gas selection solenoid 130. The selection of the carrier gas is accomplished with the carrier gas selection switch found on the control console. Downstream of the solenoid the chosen carrier gas flow rate is obtained with a flow meter. Further downstream, carrier gas inline heater 44 heats the carrier gas prior to entraining the polymer powder. Carrier gas feedback thermocouple 46 is located adjacent to carrier gas inline heater 44 and serves to provide feed back to the carrier gas temperature controller (not shown). The heated carrier gas then flows through eductor 52 which is located inside powder bin 124. Eductor 52 is situated at the bottom of supply hopper 50. The vacuum created by eductor 52 draws powdered polymer foam constituents into the carrier gas stream and mixture 56 is transported into umbilical hose 54 and out to spray gun nozzle 66. Bypass solenoid 132 is located just upstream from in-line eductor 52. Solenoid 132 routes carrier gas 40 either through in-line eductor 52 in hopper 50 or routes carrier gas 40 around hopper 50. Bypass solenoid 132 is activated by the trigger on spray gun 20. The use of the bypass arrangement ensures a constant flow of gas through the flow tip. Thus, the flow that exits spray gun nozzle 66 contains entrained polymer only when the trigger is depressed. Spray gun holder 134 provides a place to store spray gun 20 when it is not in use.

Figure 4:
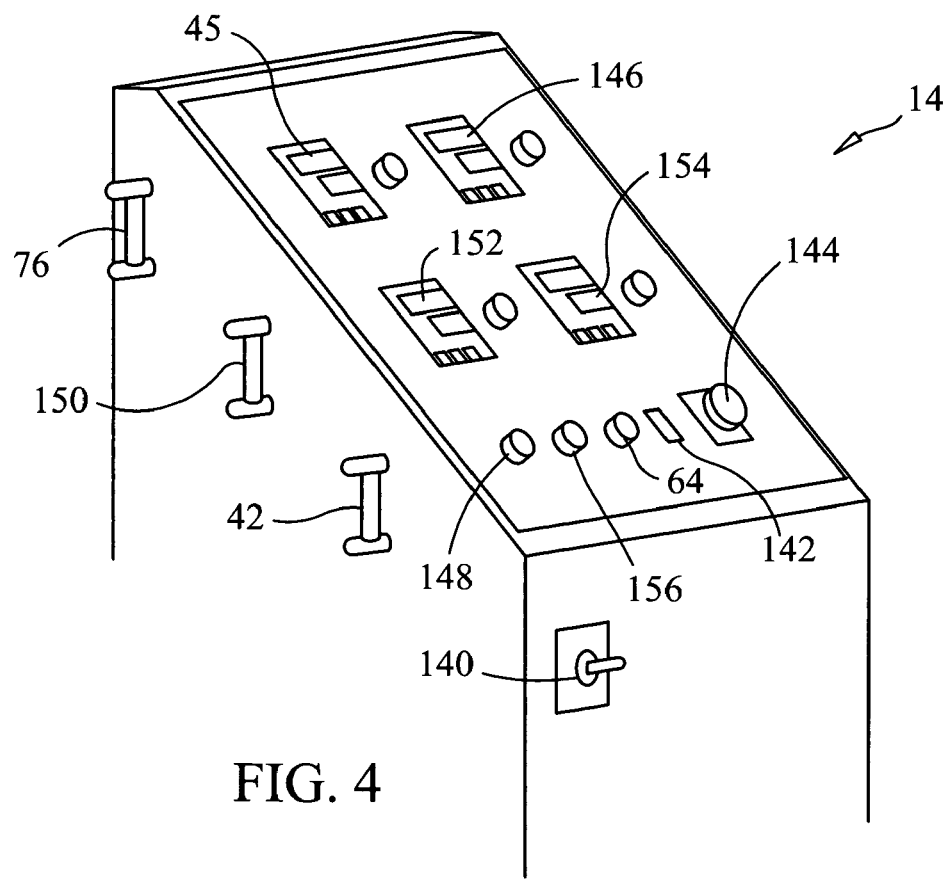
FIG. 4 is a perspective view of the control panel of a preferred embodiment of the invention.

Referring to FIG. 4, control panel 14 comprises the process controls for a preferred embodiment of the invention. Power to system 10 is controlled by main power switch 140. The carrier gas is chosen with carrier gas selection switch 142. The carrier gas flow rate is adjusted with carrier gas flow meter 42. The temperature of carrier gas 40 is controlled with carrier gas temperature controller 45. Power to the radiant heater in spray gun 20 (heating zone heater 72) is controlled by spray gun heater controller 144 (e.g., 0-240 VAC variable voltage transformer with panel mounted on/off and level control dial). The flow of convective heating gas 74 to the spray gun is regulated with convective heating gas flow meter 76. Voltage cascade switch 64 allows the electrostatic capabilities of spray gun 20 to be enabled or disconnected by providing power to voltage cascade 62. Once enabled, the electrostatic function turns on when the spray gun trigger is engaged. Umbilical hose heater controller 146 for the umbilical hose heaters ensures the temperature increase due to pre-heating of polymer powder 48 is not lost during transport to the head of spray gun 20. Control panel 14 also has vibrator control switch 148 to enable or disable supply hopper vibrator 126. In a preferred embodiment, nozzle cooling medium flow meter 150 is provided for controlling the flow rate of the nozzle cooling medium. In a preferred embodiment, auxiliary temperature controllers 152, 154, and auxiliary activation switch 156 are also provided.

In a preferred embodiment, system 10 is powered by 480-volt single-phase power. The primary transformer is rated at 15 kW and converts all of the incoming electrical power to 240 volts. 3 kW of the 240-volt power produced is transformed into 120 single-phase power. The 12 kW of 240 power is used to power heaters while the 120-volt power is used for controls, lights, corona power supply, solenoids, and some light duty heating applications. Safety features include lighted switches to indicate when a given item is in use, individual fuses for each component, pressure switch overrides for gas heaters, power-on beacon, and a main panel switch that prevents the thermal spray cart from being powered when the circuits are exposed.

Figure 5:
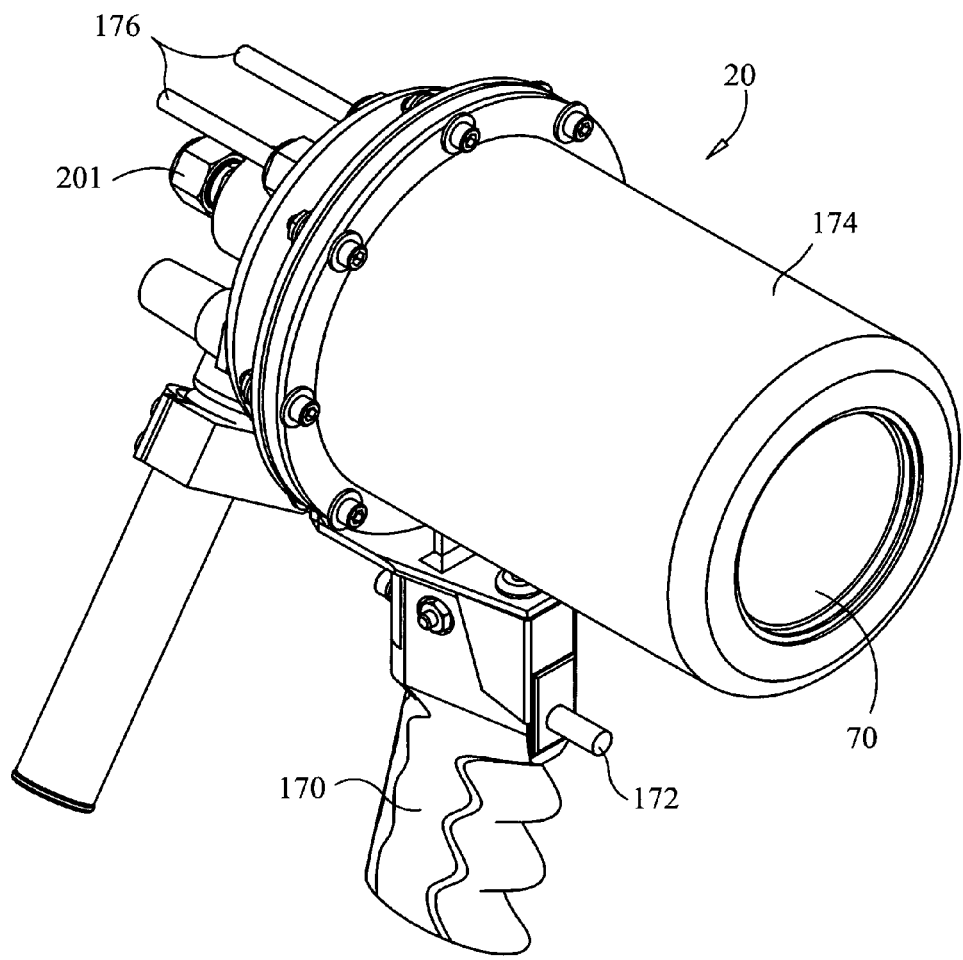
FIG. 5 is a perspective view of the thermal spray gun portion of a preferred embodiment of the invention.

Referring to FIG. 5, thermal spray gun segment 20 of a preferred embodiment of the invention is illustrated. In this embodiment, spray gun 20 is operated single-handed by an operator by holding grip 170. Depressing trigger 172 activates the eduction of polymer powder 48 into carrier gas stream 40. Mixture 56 carrying powder 48 enters spray gun 20 through carrier gas inlet 201. The operator is protected from heat emanating from radiant/convective heating zone 70 by radiant shroud 174. Inlet and outlet connectors 176 for the nozzle cooling media are also shown on FIG. 5.

Figure 6:
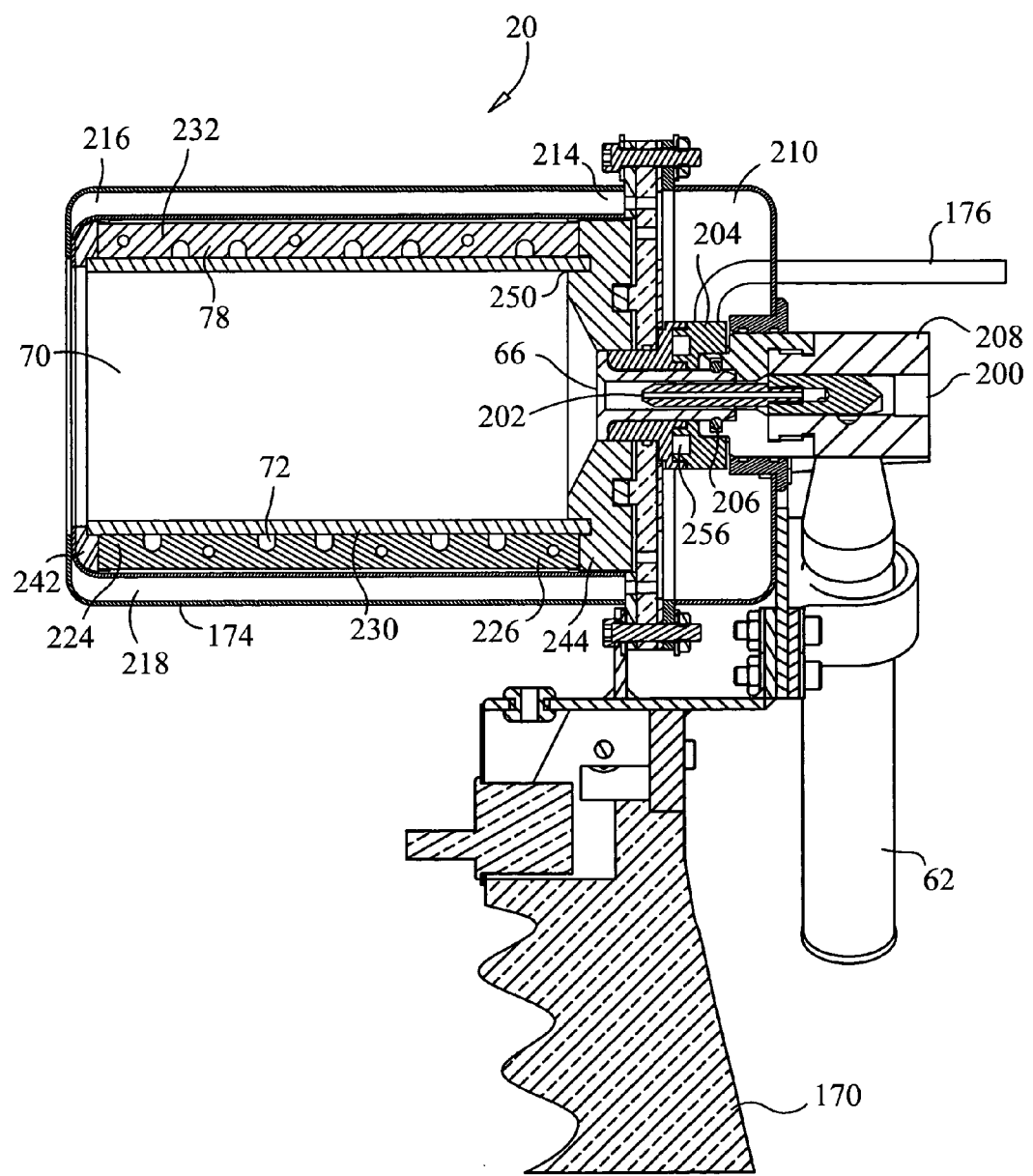
FIG. 6 is a cross-sectional view of the thermal spray gun portion of a preferred embodiment of the invention.

Referring to FIG. 6, a cross-sectional view of thermal spray gun 20 is presented showing the details of a preferred embodiment of the gun assembly. The mixture of powder 48 and carrier gas 40 that is conveyed through umbilical hose 54 enters the gun barrel 200 through carrier gas inlet and travels around the corona produced by corona charging tip 202. Charging tip 202 receives power from voltage cascade 62. Charging tip is inside solid ceramic spray nozzle 66 which shapes powder flow 56 as it enters radiant/convective heating zone 70. The gas or fluid that provides for nozzle cooling enters heat sink 204 via the nozzle cooling channel 256 connected to an outside source by the nozzle cooling media inlet and outlet 176 (one of which is behind the other in this view). Nozzle 66 is held in place by locking O-ring 206 between nozzle 66 and nozzle support 208. Nozzle 66 is also held in place by heat sink 204. In a preferred embodiment, Teflon® tubing is used to convey the particles, which forms a positive tribocharge. This tribocharge is preferably utilized and enhanced by a positive source 70 kV electrode to produce a positive electrostatic charge on the conveyed particles.

Figure 9:
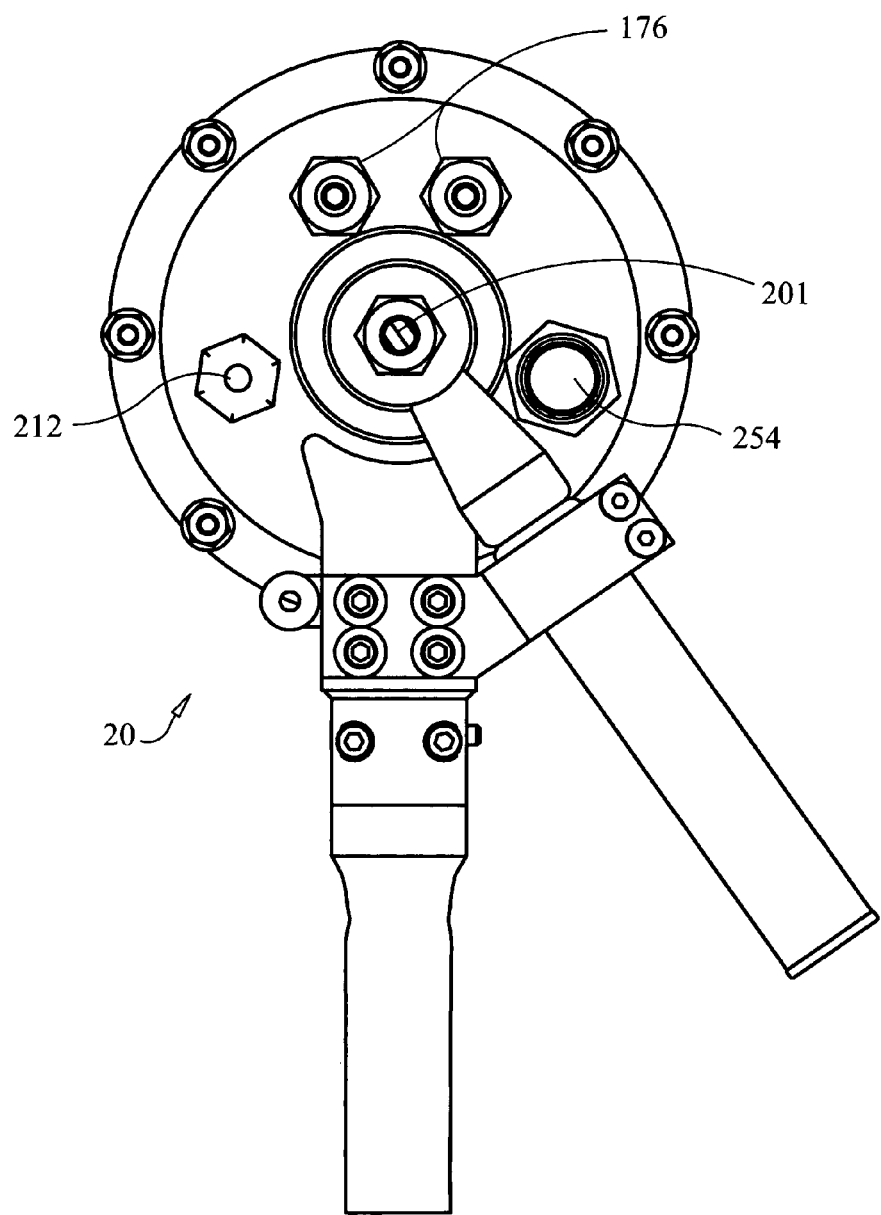
FIG. 9 is a rear elevation view of the connectors on the thermal spray gun of a preferred embodiment of the invention.

The gas (convective heating gas 74) that cools radiant shroud 174 and convectively heats powder 48 carried into radiant/convective heating zone 70 first enters plenum 210 through convective heating gas inlet 212 (shown on FIG. 9). When convective heating gas 74 enters plenum 210, it is normally at room temperature. This room temperature gas flows from aft end 214 to forward end 216 of radiant shroud 174 through cooling annulus 218. This gas flow through cooling annulus 218 helps reduce the outside temperature of radiant shroud 174. Near forward end 216, gas 74 is directed to heating annulus 78. The gas 74 then flows from front end 224 to back end 226 of heating annulus 78 while passing over coiled heater elements 72. Heater elements 72 are evenly distributed around radiant core 230 and kept in place by heater element supports 232. These four supports 232 are evenly spaced around radiant core 230 and are indexed in place by slots 240 machined into the forward end cap 242 and aft end cap 244, which are preferably constructed of a low density ceramic. Once the now hot gas has reached back end 226 of heating annulus 220 it is directed through a series of orifices 250 machined in aft end cap 224. Orifices 250 direct jets of hot convective heating gas 74 from heating annulus 220 into radiant/convective heating zone 70 inside of radiant tube 230.

Figure 7:
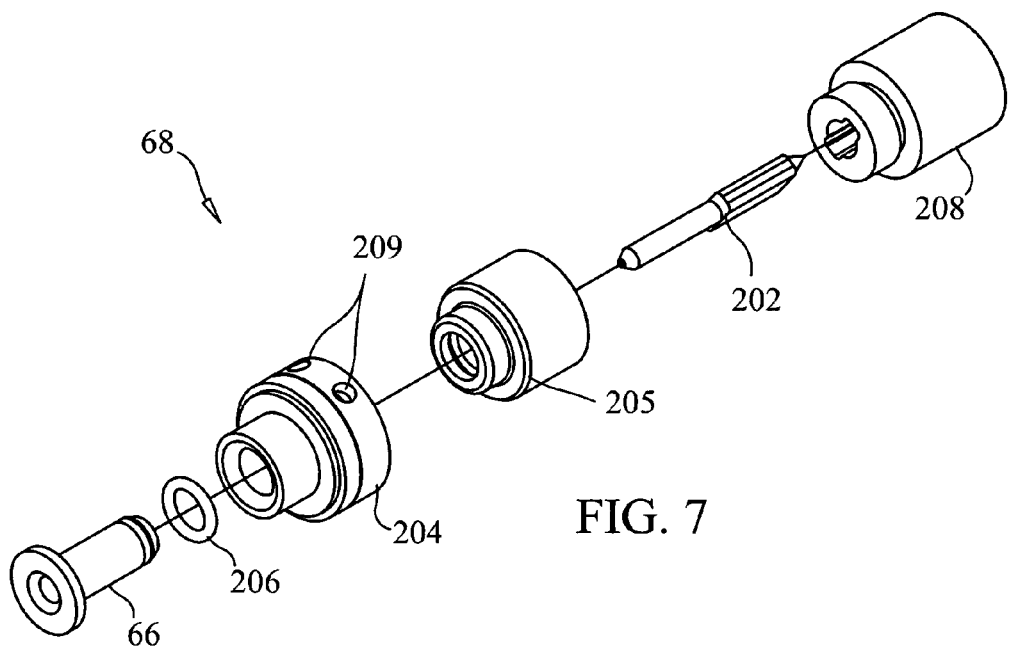
FIG. 7 is an exploded view of the nozzle portion of a preferred embodiment of the invention.

Referring to FIG. 7, an exploded view of the components of nozzle assembly 68 of a preferred embodiment of the invention is presented. Nozzle assembly 68 comprises nozzle 66, locking O-ring 206, heat sink 204, corona mount 205, charging tip 202 and nozzle support 208. Heat sink 204 has two mounting holes 209 to which inlet and outlet connectors 176 attach and by which the cooling medium enters and exits heat sink 204.

Figure 8:
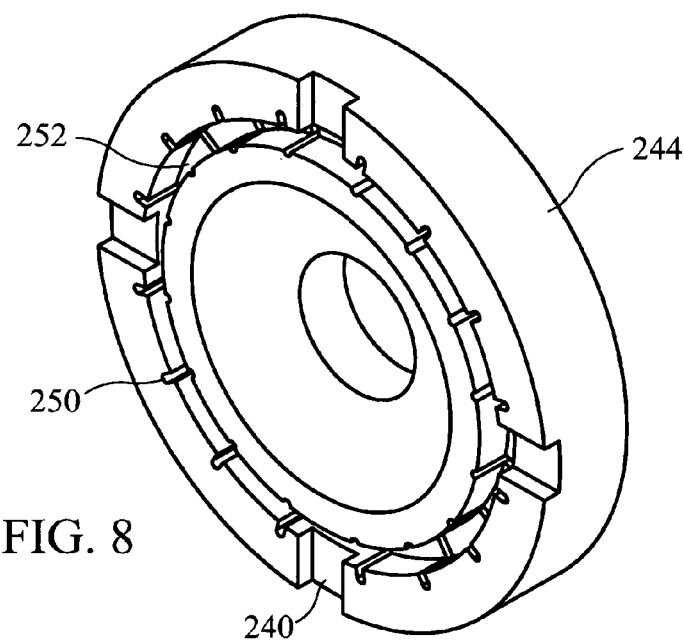
FIG. 8 is perspective view of the aft end cap inside the thermal spray gun of a preferred embodiment of the invention.
Figure 13:
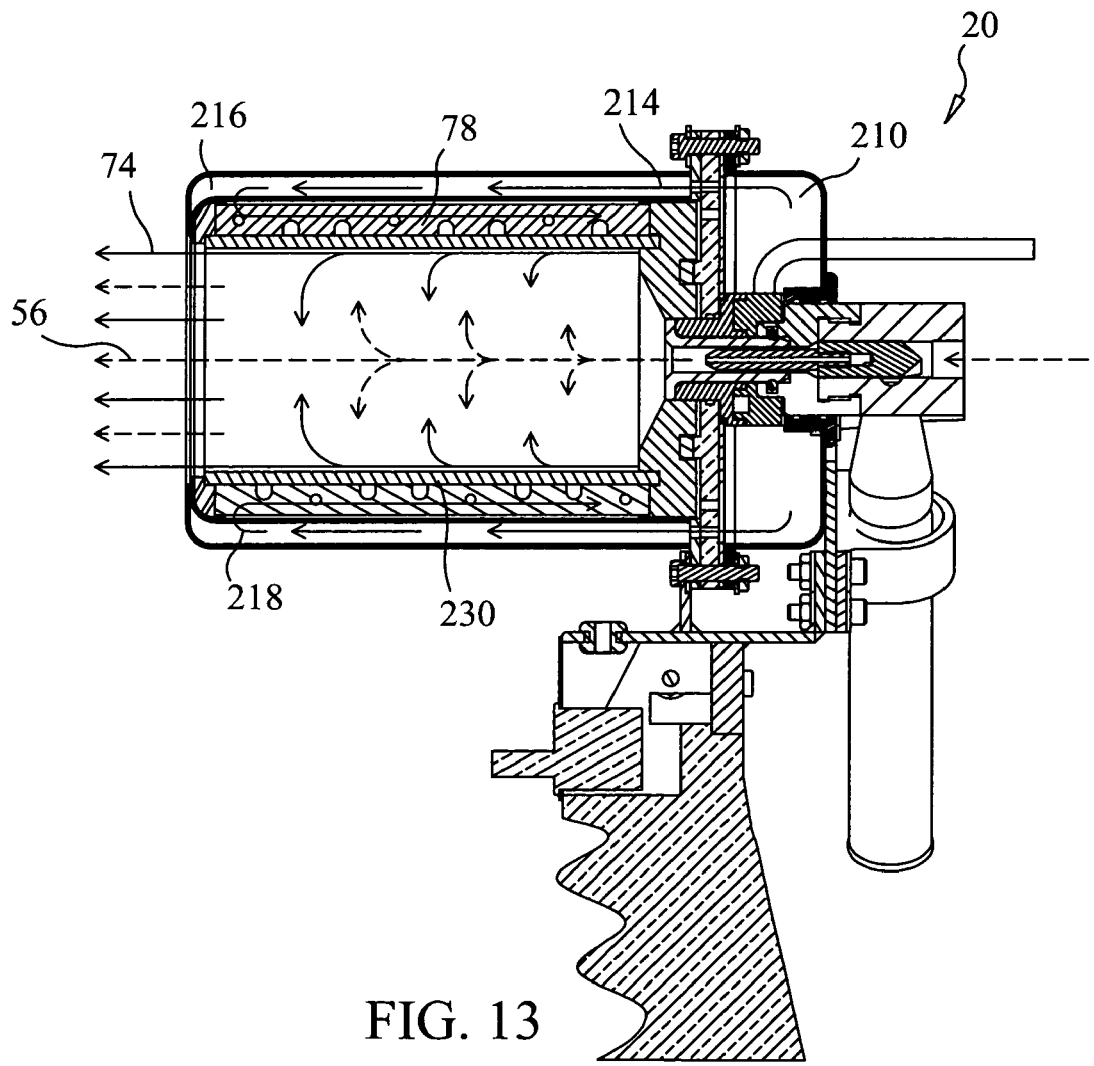
FIG. 13 is a cross-sectional view of the thermal spray gun portion of a preferred embodiment of the invention showing convective heating air flow.

Referring to FIG. 8, the details of the gas jet feature of a preferred embodiment of the invention is presented. The jets preferred comprise about 16 evenly-spaced ⅟16 inch wide by ¼ inch long radial slots 250 cut into aft end cap 244. Radial slots 250 intersect circumferential slot 252 machined into aft end cap 244 that serves to position and retain radiant tube 230. Radial slots 250 are positioned to provide a path for hot gas 74 from heating annulus 220 into radiative/convective heating zone 70. The opening of each of radial slots 250 inboard of the inner diameter of radiant tube 230 inner creates each of jet orifices 250. Each of jet orifices 250 preferably has an area of about 0.0015 in². At a gas flow rate of about 3 cubic feet per second (cfm), the velocity of the jet flow from each of the orifices 250 is approximately 3,600 in/sec. At this speed, a portion of the jet flow remains attached to the inner wall of radiant tube 230 for the entire length of radiant tube 230, serving as a barrier to buildup of molten polymer on the inner wall of radiant tube 230. As shown in FIG. 13, the remainder of the gas in the hot jet mixes with and melts polymer powder 48 contained in carrier gas 40 that is exiting spray nozzle 66. The low velocity molten material exits the end of radiant tube 230, carried along by the combination of carrier gas 40 and hot gas 74 from the heating jets and strikes substrate material 82 which is to be coated.

Referring to FIG. 9, a rear view of spray gun 20 of a preferred embodiment of system 10 is presented. Nozzle cooling media inlet and outlet ports 176, carrier gas inlet 201, convective heating gas inlet 212, and air tight connector 254 for the heater element hookup wire are shown.

Figure 10:
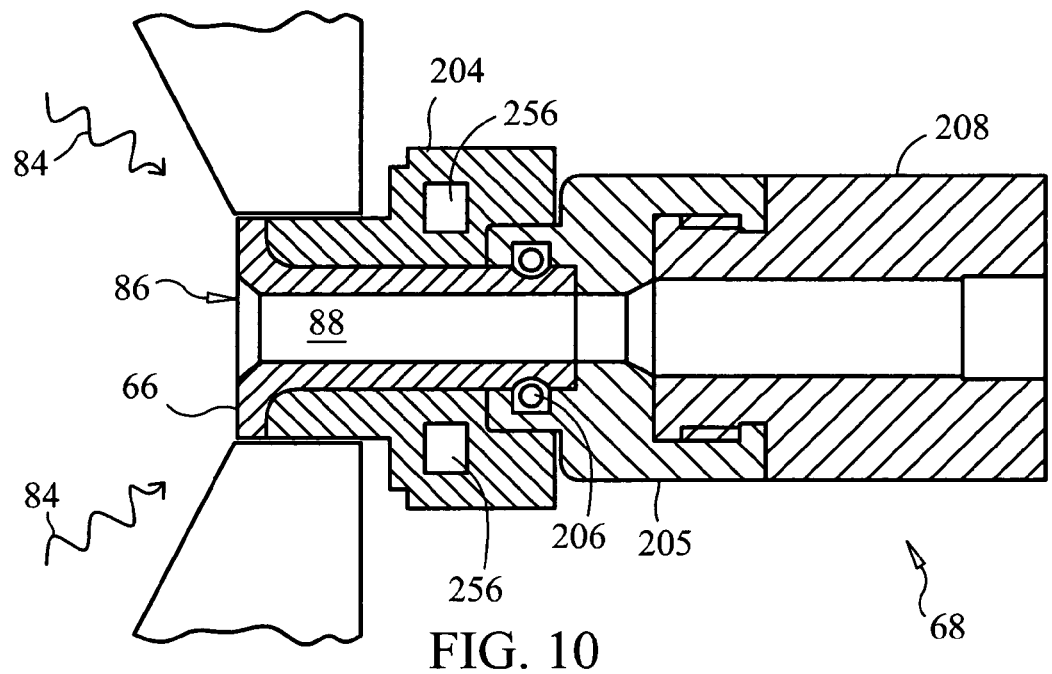
FIG. 10 is a longitudinal cross-sectional view of the nozzle assembly of a preferred embodiment of the invention.

Referring to FIG. 10, a longitudinal cross-sectional view of a preferred embodiment of nozzle assembly 68 mounted in aft end cap 244 is presented. During operation of this embodiment of system 10, transfer of radiant heat 84 elevates the temperature of nozzle face 86. If the temperature of nozzle face 86 exceeds the melting temperature of polymer 48 as it is being sprayed, polymer 48 can begin to build up on nozzle throat 88 at or near the exit of nozzle 66. If allowed to occur, this buildup eventually chokes the flow of carrier gas 40. In a preferred embodiment, nozzle face has a smaller nozzle face diameter (e.g., 0.99 inch) versus the 1.25 inch diameter for less preferred embodiments, while maintaining an adequate inner diameter for nozzle throat 88. Using a smaller nozzle face diameter reduces by over thirty percent the area of nozzle face 86 that can be heated by radiation. This in turn reduces the rate of heat buildup in nozzle 66.

Figure 11:
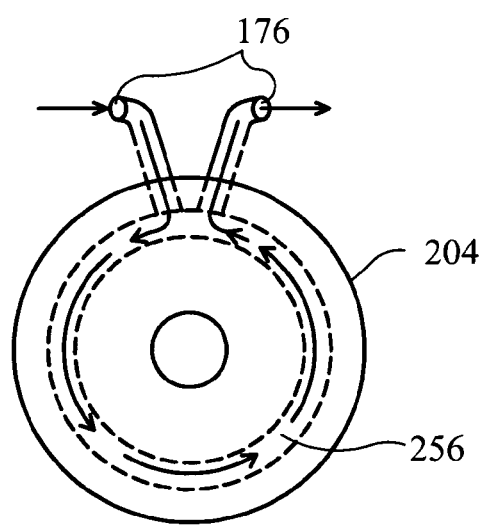
FIG. 11 is a transverse cross-sectional view of the heat sink of a preferred embodiment of the invention.

Referring to FIG. 11, a transverse cross-sectional view of a preferred embodiment of heat sink 204 is presented. In this preferred embodiment, nozzle assembly 68 comprises heat sink 204 that is in intimate contact (e.g., via conductive paste) with the exterior surface of nozzle 66. Heat absorbed by nozzle face 86 is conducted through the nozzle material and into heat sink 204, which is preferably made of copper or some other material with a high heat transfer coefficient. This heat is further conducted to the heat sink cooling channel 256 where it is convectively removed by the circulating heat sink fluid. The cooling fluid is typically water that enters cooling channel 256 via the cooling medium inlet connector. It then circulates circumferentially in cooling channel 256 before exiting via the cooling medium outlet connector. This cooling operation keeps nozzle tip 86 from fouling, an improvement over less preferred embodiments.

Figure 12:
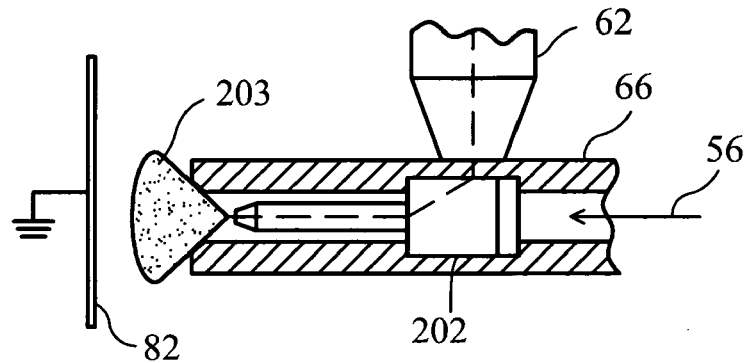
FIG. 12 is a longitudinal cross-sectional view of the nozzle of a preferred embodiment of the invention showing its relation to the corona tip.

Referring to FIG. 12, a longitudinal cross-sectional view of nozzle 66 of a preferred embodiment of the invention is presented showing its relation to corona tip 202. In this embodiment, corona tip 202 lies in the flow stream of carrier gas 40. The flow stream of carrier gas 40 is split and flows around corona tip 202 as it proceeds towards the exit of nozzle 66. Corona tip 202 provides for a point source termination of high voltage cascade 62 that produces a corona discharge field in high-voltage electrode corona discharge space 203. The particles of polymer 48 passing through this field acquire a charge and are attracted to grounded substrate 82.

Referring to FIG. 13, a cross-sectional view of thermal spray gun portion 20 of a preferred embodiment of the invention is presented, showing the flow of convective heating air 74 and carrier gas 40. Solid arrows represent the flow of convective heating air 74 in a preferred embodiment of the present invention. In this embodiment, ambient temperature convective heating air 74 enters system 10 through rear plenum 210. This convective heating air 74 is then directed through aft end 214 of outer cooling annulus 218. While flowing through annulus 218, convective heating air 74 picks up heat that is flowing outward though the walls surrounding radiant/convective heating zone 70 of gun 20 and reduces the temperature of outer shroud 174. At forward end 216 of cooling annulus 218, convective heating air 74 is directed into inner heating annulus 78. Convective heating air 74 flows towards aft end cap 244 of device 10 over and around coiled heating elements 72. In inner heating annulus 78, convective heating air 74 is further heated. Finally, the hot convective heating air 74 is directed into inner cavity 70 of radiant tube 230 of though small orifice openings 250, which are preferably machined into aft end cap 244 and distributed around the edge of heating annulus 78. These openings form jets of hot gas that enter cavity 70 along the inner wall of radiant tube 230. These attached jets of convective heating gas 74 are described below. These jets of hot gas mix with carrier gas stream 40 that contains entrained polymer powder 48 (i.e., mix with mixture 56, the flow of which is represented by dashed arrows).

The tendency for a free jet of gas to attach itself to a nearby wall is known as the Coanda Effect. A jet of gas normally entrains surrounding gas as its momentum diffuses outwards. If the jet is close to a wall then the jet cannot draw gas through the wall and the jet itself is attracted towards the wall, attaching itself to the wall. In effect, some of the momentum of the jet is maintained and allows the jet to travel along the wall until the momentum diffusion occurring on the free surface has dissipated the jet. The inlet velocity of the jet determines the momentum of the flow. The higher the inlet velocity, the farther the jet flows along the wall. In a more preferred embodiment of the present invention, the jet inlet velocity is established at a rate that is large enough to allow the incoming hot air jets to remain un-dissipated and attached the full length of radiant tube 230.

In the preferred embodiment illustrated in FIG. 13, the jets of hot convective heating gas 74 serve three purposes. The hot gas 74 mixes with the stream of fluidized polymer mixture 56 that is entering inner chamber 70 through spray nozzle 66 and causes polymer material 48 to heat to melt temperature. The jets of hot gas 74 also serve to keep the molten particles of polymer 48 from adhering to the inner wall of radiant/convective heating zone 70. Jets of gas 74 with sufficient velocity tend to attach themselves to a surface adjacent to the jet exit. A portion of the jet remains attached to the inner wall of the heating zone 70 as it travels the length of radiant tube 230 and exits into free space. Finally, portions of the hot jets tend to diffuse into the flow of carrier gas 40 that has fluidized and transported polymer material 48 into heating zone 70. The mixing of convective heating gas 74 and the mixture of carrier gas 40 and polymer 48 results in a more uniform thickness of the deposited sprayed material. Without this diffusion, the thickness of the spray pattern tends to be greatest at the center of the spray pattern and rapidly tapering away towards the outer radius of the pattern.

In a preferred embodiment, the invention allows for onsite application of high temperature, high performance polymer foams. The invention has been used to investigate the fabrication of a number of foam compositions consisting of friable polyimide microballoons, polyimide binders, polyetherimide binders, liquid crystal polymer binders, blowing agents, hollow ceramic spheres, hollow glass spheres, and thermoplastic base coats. A particular advantage demonstrated by preferred embodiments of this technology is the ability to process high melt temperature polymers such as polyamides (500° F.), polyetherimides (700° F.) and polyimides (700° F.).

The operational procedure for preparing foams is simple and easy to follow. A preferred sequence of the steps and settings is as follow for fabricating a polyimide spray foam using polyimide microballoons and a polyimide powder binder: Plug in a 480 volt single phase power into the socket at rear of device 10. Attach nitrogen and compressed air lines to the pair of carrier gas inlet connectors (quick connects 128) at the rear of device 10. Initially, select air as the carrier gas using the carrier gas selection switch 142. Adjust eductor/carrier gas flowrate to about 30 liters per minute (lpm) with eductor/carrier gas flowmeter 42 and set spray gun convective heating gas flowrate to about 100 lpm with marked flowmeter 76. Adjust the eductor/carrier gas heating set point to a desired temperature of about 200° C. and engage the switch to right of controller 45. Additionally, set the umbilical heating controller to about 200° C. to maintain desired umbilical temperature and engage the switch to right of controller 146. Set the spray gun convective heating gas heater controller 144 to a desired power level of about 210 volts. Mix the desired proportion of polymer microspheres and binding resin (typically 80:20 by weight). It takes approximately 10 liters of the premixed polymer microspheres and binder resin material to prepare a 30 centimeter (cm)×30 cm panel 3 cm thick. That is, place 10 liters of premixed material in the hopper for every 2.7 liters of foam to be produced. The amount of foam desired depends on the surface area to be coated and the depth of coating required. Place the formulated contents into the powder bin 16 and close the latches. Once the temperature of the umbilical heater line is at steady state, device 10 is ready to spray foam panels.

Forming a spray foam panel involves the following steps: Wear respirator, eye protection, light duty gloves, and work in well-ventilated area. Engage the high voltage corona by pressing the push-button switch 64. Select nitrogen gas using carrier gas selection switch 142 when spraying powder. During cleaning, warm-up and cool-down leave carrier gas selection switch 142 in the compressed air or off position. Begin spraying by squeezing powder delivery trigger 172 on gun grip 170. Block in the perimeter of the area to be coated with light coats and bake these coats onto surface 82. Once a base coat has been created, add additional layers in a manner similar to painting with a paint spray gun. With the trigger disengaged, recoat the area just sprayed with the stream of hot gas issuing from the spray gun 20. Continue as needed to flow and melt the foam constituents. During cool-down, power down eductor and umbilical heaters (leave air flow on). Reduce the convective heater gas heater controller until the switch snaps off. Turn off vibrator 126 and corona with pushbutton switches. Let air flow through device 10 for at least ten minutes. Clean spray gun 20, shut off the air supply and close the valve on the nitrogen bottle.

More preferred embodiments of system 10 experience decreased material fouling that is associated with less preferred (e.g., undirected, diffuse heating gas) thermal spray systems due to the incorporation of the attached jet cleansing gas feature into more preferred embodiments. In the more preferred embodiments, the attached jet hot gas flow convectively transfers heat to polymer powders 48 entrained in the carrier gas flow. The attached jet gas keeps polymer powder from accumulating on the inner wall of radiant tube 230. The attached jet gas flow diffuses into the carrier gas flow and creates a more uniform thickness of the deposited, sprayed material.

In a more preferred embodiment of the invention, the overall size and weight of spray gun 20 is reduced when compared to less preferred embodiments. In a less preferred embodiment, spray gun 20 is about 6.5 inches in diameter and weighs about 12 lbs. In a more preferred embodiment, spray gun 20 is about 4.6 inches in diameter and weighs less then 6 lbs. This is a significant ergonomic improvement. The smaller diameter makes it easier for the operator to watch the surface being sprayed and the lower weight reduces handling fatigue.

In a more preferred embodiment of the invention, spray gun 20 comprises improved means for reducing tip fouling, e.g., a heat sink to reduce nozzle tip temperatures. In comparison, less preferred embodiments direct incoming ambient air around the outside of the nozzle to help cool the nozzle. In these embodiments, the rate of heat removal may not keep up with the rate of nozzle heating during sustained spray operations. More preferred embodiments have enough heat removal capacity to keep the nozzle tip temperature below the sticky/melt temperature of the polymer powder 48. With a cooler nozzle, the polymer powder does not melt in the nozzle throat and clog the nozzle.

In a more preferred embodiment of the invention, the outer surface of radiant shroud 174 has a lower temperature during operation. In less preferred embodiments, the temperature of the outer surface of radiant shroud 174 can reach 170° C. When operating more preferred embodiments at settings that produce equivalent exit temperatures, the temperature of the outer surface of radiant shroud 174 can be maintained below 65° C. This is due to the improved circulation path of incoming convective heating gas 74 as described above.

In a more preferred embodiment of the invention, reduced charring and fouling of polymer material on the inner surface of radiant tube 230 occurs during operation of system 10. This is due to the cleansing, air curtain effect of the attached jet flow. The attached jets prevent polymer material 48 that is entrained in carrier gas 40 from coming into contact with the inner walls of radiant tube 230.

In a more preferred embodiment of the invention, an improved spray pattern is produced. In less preferred embodiments, the spray pattern is dominated by the momentum of carrier gas 40 and tends to be small in diameter and produce a non-uniform application of material. In the more preferred embodiments, carrier gas 40 is diffused by the jets of convective heating air 74. This creates a spray pattern that is larger in diameter with improved applied thickness uniformity.

In a preferred embodiment, polymer 48 is seeded with a conductive material before it is entrained in carrier gas 40. Preferably, polymer 48 is seeded with a conductive material produced by Potters Industries Inc., called D90. This conductive material comprises silver-coated hollow glass spheres with a nominal diameter of about 62 micrometers (µm) and a bulk density of about 0.5 grams per cubic centimeter (g/cc).

Other Potters Industries' materials that are appropriate for spraying with system 10 range from 20 to 100 micrometers in diameter and comprise coated and uncoated metal, glass, ceramic, or plastic hollow or solid spheres, some with metal or organic coatings. A person having ordinary skill in the art will know that there are other manufacturers of such products.

Applicants believe that, with preferred embodiments of system 10, the low velocity (less then 1000 inches per second nozzle exit velocity) of sprayed material 56 provides advantage over the high velocity thermal spray devices in the background art. This low speed flow technology is well suited for spray coating using particles of various sizes, shapes, and densities as is the case with syntactic coatings, functionally graded coatings, and structural coatings. The low velocities result in lower drag forces on the particles in flight. Therefore, it is possible to use particles with higher drag coefficients with system 10 than with background art devices.

The low velocities possible with preferred embodiments of system 10 also enable the use of electrostatic charging technology. The inertial forces induced in the polymer spray 56 are low enough to be overcome by the electrostatic attractions that direct charged particles to grounded substrate 82. This results in increased material transfer efficiency.

Many variations of the invention will occur to those skilled in the art. Some variations include field-mobile versions of the system. Other variations call for preheating the material or substrate, mixing of material and air upstream from the nozzle, heat addition after the material leaves the nozzle, using sensors to control the distance between the spray nozzle and the substrate being sprayed or sensing the temperature of the substrate for use in adjusting the intensity of radiation heating. All such variations are intended to be within the scope and spirit of the invention.

Although some embodiments are shown to include certain features, the applicant(s) specifically contemplate that any feature disclosed herein may be used together or in combination with any other feature on any embodiment of the invention. It is also contemplated that any feature may be specifically excluded from any embodiment of an invention.

What is claimed is:

1. A method of forming a polymer foam comprising:
   introducing a mixture of a carrier gas, polymer, and microballoons into an inner chamber of a spray gun;
   introducing a first gas into an annular region surrounding the inner chamber of the spray gun and introducing the first gas into the inner chamber through a plurality of openings from the annular region into the inner chamber;
   heating the first gas to yield a heated gas;
   heating the mixture by mixing it with the heated gas, such that the polymer does not substantially build up on the inner chamber; and
   spraying the heated mixture onto a substrate to form a foam.

2. The method of claim 1, comprising radiatively heating the mixture within the inner chamber as the mixture is propelled along the inner chamber.

3. The method of claim 1, comprising radiatively heating the mixture within the spray gun after the mixture is sprayed out of the inner chamber.

4. The method of claim 1, comprising radiatively heating the mixture after the mixture has been sprayed onto the substrate.

5. The method of claim 4, wherein the mixture is radiantly heated on the substrate by heat emanating from the spray gun.

6. The method of claim 1, wherein the microballoons are coated with a conductive material.

7. The method of claim 1, wherein the microballoons are coated with an organic material.

8. The method of claim 1, comprising introducing a static charge to the mixture prior to introducing the mixture into the inner chamber.

9. The method of claim 1, wherein the polymer comprises a polyimide.

10. The method of claim 1, wherein the mixture further comprises a blowing agent.

11. The method of claim 1, wherein the mixture is introduced into the inner chamber via a nozzle, the method further comprising controlling the temperature of the nozzle below the melting temperature of the polymer.

12. The method of claim 11, comprising conveying the mixture to the nozzle via a heated hose.

13. The method of claim 1, comprising radiatively heating the substrate via radiant panels coupled to the spray gun.

14. The method of claim 1, wherein the first gas traces a serpentine path between entering the annular region and exiting into the inner chamber.

15. The method of claim 1, wherein the first gas is heated in the annular region.

16. The method of claim 1, wherein the spray gun creates suction at only one stage.

17. A method of forming a polymer foam comprising:
introducing a mixture of a carrier gas, polymer, and blowing agent into an inner chamber of a spray gun;
introducing a first gas into an annular region surrounding the inner chamber of the spray gun and introducing the first gas into the inner chamber through a plurality of openings from the annular region into the inner chamber;
heating the first gas to yield a heated gas;
heating the mixture by mixing it with the heated gas, such that the polymer does not substantially build up on the inner chamber; and
spraying the heated mixture onto a substrate to form a foam.

18. The method of claim 17, comprising radiatively heating the mixture within the inner chamber as the mixture is propelled along the inner chamber.

19. The method of claim 17, comprising radiatively heating the substrate via radiant panels coupled to the spray gun.

20. The method of claim 17, comprising introducing a static charge to at least a portion of the mixture prior to introducing the mixture into the inner chamber.

21. The method of claim 17, wherein the polymer comprises a polyimide.

22. The method of claim 17, wherein the mixture further comprises a plurality of microballoons.

23. The method of claim 17, wherein the mixture is introduced into the inner chamber via a nozzle, the method further comprising controlling the temperature of the nozzle below the melting temperature of the polymer.

24. The method of claim 23, comprising conveying the mixture to the nozzle via a heated hose.

25. The method of claim 17, wherein the first gas traces a serpentine path between entering the annular region and exiting into the inner chamber.

26. The method of claim 17, wherein the first gas is heated in the annular region.

27. The method of claim 17, wherein the spray gun creates suction at only one stage.

* * * * *